(12) United States Patent
Xie et al.

(10) Patent No.: US 11,598,956 B2
(45) Date of Patent: *Mar. 7, 2023

(54) EYEBALL TRACKING SYSTEM AND EYEBALL TRACKING METHOD

(71) Applicant: HUAWEI TECHNOLOGIES CO., LTD., Guangdong (CN)

(72) Inventors: Zhenlin Xie, Dongguan (CN); Yong Cao, Munich (DE); Patricia Leichliter, Santa Clara, CA (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,367

(22) Filed: Jun. 17, 2021

(65) Prior Publication Data

US 2021/0311303 A1     Oct. 7, 2021

Related U.S. Application Data

(63) Continuation of application No. 16/790,137, filed on Feb. 13, 2020, now Pat. No. 11,067,795, which is a (Continued)

(30) Foreign Application Priority Data

Aug. 14, 2017   (CN) .......................... 201710694351.0

(51) Int. Cl.
  *G02B 27/00*      (2006.01)
  *G02B 26/08*      (2006.01)
  *G06V 40/19*      (2022.01)

(52) U.S. Cl.
  CPC ..... *G02B 27/0093* (2013.01); *G02B 26/0816* (2013.01); *G02B 26/0875* (2013.01); *G06V 40/19* (2022.01)

(58) Field of Classification Search
  CPC .................... G02B 27/0093; G02B 26/0816
  See application file for complete search history.

(56) References Cited

U.S. PATENT DOCUMENTS 5,270,748 A   12/1993 Katz
5,703,637 A   12/1997 Miyazaki et al.
(Continued)

FOREIGN PATENT DOCUMENTS

CN    102447858 A    5/2012
CN    104391574 A    3/2015
(Continued)

*Primary Examiner* — Jerry T Jean Baptiste
(74) *Attorney, Agent, or Firm* — Womble Bond Dickinson (US) LLP

(57) ABSTRACT

An eyeball tracking system is provided, which includes: an illumination light source, configured to transmit an illumination light ray to a beam scanner; the beam scanner, configured to project the illumination light ray onto an entrance pupil optical apparatus; the entrance pupil optical apparatus, configured to reflect, reproduce, or refract the illumination light ray, so that the reflected, reproduced, or refracted illumination light ray illuminates an eyeball; a photoelectric detector, configured to: collect a receive optical power value of an eyeball reflection light ray, and send the receive optical power value to a controller; and the controller, configured to: receive the receive optical power value sent by the photoelectric detector, determine, based on the receive optical power value, an optical power reference value, and determine a current gaze direction of the eyeball based on the optical power reference value.

18 Claims, 20 Drawing Sheets

Related U.S. Application Data continuation of application No. PCT/CN2018/080332, filed on Mar. 23, 2018.

(56) References Cited

U.S. PATENT DOCUMENTS

| | | | |
|---|---|---|---|
| 6,299,308 | B1 | 10/2001 | Voronka et al. |
| 9,116,337 | B1 | 8/2015 | Miao |
| 9,386,921 | B2 | 7/2016 | Cleveland |
| 2007/0159599 | A1* | 7/2007 | Yamada ............ A61B 3/113 351/211 |
| 2009/0279736 | A1 | 11/2009 | Laconte et al. |
| 2012/0105802 | A1* | 5/2012 | Duong ............ G02C 7/081 351/210 |
| 2012/0133891 | A1 | 5/2012 | Jiang |
| 2012/0307208 | A1 | 12/2012 | Trousdale |
| 2015/0186722 | A1 | 7/2015 | Cho et al. |
| 2015/0316982 | A1 | 11/2015 | Miller |
| 2016/0139664 | A1 | 5/2016 | Dai et al. |
| 2016/0166146 | A1 | 6/2016 | Sarkar |
| 2016/0295133 | A1 | 10/2016 | Rudmann et al. |
| 2016/0349516 | A1 | 12/2016 | Alexander et al. |
| 2017/0004363 | A1 | 1/2017 | Dore et al. |
| 2017/0060235 | A1 | 3/2017 | Banyay et al. |
| 2018/0109783 | A1* | 4/2018 | Austin ............ G01J 3/506 |
| 2019/0188469 | A1 | 6/2019 | Jin et al. |

FOREIGN PATENT DOCUMENTS

| | | |
|---|---|---|
| CN | 104793741 A | 7/2015 |
| CN | 105847540 A | 8/2016 |
| CN | 205485072 U | 8/2016 |
| CN | 105955491 A | 9/2016 |
| CN | 106324831 A | 1/2017 |
| CN | 106339085 A | 1/2017 |
| CN | 106484094 A | 3/2017 |
| CN | 106774885 A | 5/2017 |
| CN | 107004132 A | 8/2017 |
| CN | 1075154661 A | 12/2017 |
| JP | 07135623 A | 5/1995 |
| RU | 2576344 C2 | 2/2016 |
| WO | 9936826 A1 | 7/1999 |
| WO | 2007011092 A1 | 1/2007 |

\* cited by examiner

EYEBALL TRACKING SYSTEM AND EYEBALL TRACKING METHOD

CROSS-REFERENCE TO RELATED APPLICATIONS

This application is a continuation of U.S. patent application Ser. No. 16/790,137, filed on Feb. 13, 2020, which is a continuation of International Application No. PCT/CN2018/080332, filed on Mar. 23, 2018. The International Application claims priority to Chinese Patent Application No. 201710694351.0, filed on Aug. 14, 2017. All of the aforementioned patent applications are hereby incorporated by reference in their entireties.

TECHNICAL FIELD

This application relates to the field of retinal projection technologies, and in particular, to an eyeball tracking system and an eyeball tracking method.

BACKGROUND

Retinal projection means that a display light ray is selectively reflected based on a wavelength and directly enters a pupil, to form a virtual display image on a retina. Compared with a traditional augmented reality (AR) or virtual reality (VR) display technology, retinal projection has a series of advantages such as no vision block, high light utilization, and a simple optical path. Retinal projection is generally recognized by the industry as one of key technologies for current AR or VR ("AR/VR" for short below) product experience innovation.

Based on different image sources, retinal projection is classified into panel-type retinal projection and scan-type retinal projection. A core technology of the scan-type retinal projection is an eyeball tracking technology. At present, common eyeball tracking technologies in the industry include an eyeball tracking technology based on a pupil center (PC) and a corneal reflection (CR) light-spot center, PCCR-based technology for short, and further include an eyeball tracking technology based on an iris center (IC) and a corneal reflection CR light-spot center, ICCR-based technology for short.

A system using the PCCR-based technology and the ICCR-based technology mainly includes an illumination sub-system, a camera sub-system, and an algorithm. Both the PCCR technology and the ICCR technology calculate a human eye gaze direction based on the camera sub-system and the illumination sub-system with reference to a corresponding algorithm, and have disadvantages of a large size, high power consumption, and high costs. In addition, a relatively low sampling frequency of a camera results in a quite low working frequency of the entire system, and therefore the PCCR technology and the ICCR technology are not suitable for a system with a low-latency requirement. This problem needs to be resolved.

SUMMARY

This application provides an eyeball tracking system and an eyeball tracking method, to resolve technical problems in an existing PCCR- and ICCR-based eyeball tracking method that a sampling frequency is low and a low-latency requirement is not satisfied.

According to a first aspect, this application provides an eyeball tracking system, including: an illumination light source, an entrance pupil optical apparatus, a beam scanner, a photoelectric detector, and a controller. The controller is electrically connected to the photoelectric detector; the illumination light source is configured to transmit an illumination light ray to the beam scanner; the beam scanner is configured to project the illumination light ray onto the entrance pupil optical apparatus; the entrance pupil optical apparatus is configured to reflect, reproduce, or refract the illumination light ray, so that the reflected, reproduced, or refracted illumination light ray illuminates an eyeball; the photoelectric detector is configured to: collect a receive optical power value of an eyeball reflection light ray, and send the receive optical power value to the controller, where the eyeball reflection light ray is a light ray reflected by the eyeball when the reflected, reproduced, or refracted illumination light ray illuminates the eyeball; and the controller is configured to: receive the receive optical power value sent by the photoelectric detector, determine, based on the receive optical power value, an optical power reference value that satisfies a specified functional relationship with the receive optical power value, and determine an eyeball line-of-sight direction that matches the optical power reference value as a current gaze direction of the eyeball based on a prestored one-to-one matching relationship between a plurality of eyeball gaze directions and a plurality of optical power reference values.

In the eyeball tracking system, some of illumination light rays are reflected by the eyeball when an illumination system including the illumination light source, the beam scanner, and the entrance pupil optical apparatus illuminates the eyeball. The illumination light rays reflected by the eyeball are referred to as eyeball reflection light rays. Because different appearances of an eyeball surface that are present when the eyeball of the human eye gazes at different directions lead to different reflection angles for an illumination light ray, different eyeball gaze directions are corresponding to different eyeball reflection light rays. In this application, the photoelectric detector collects the receive optical power value of the eyeball reflection light ray, and determines the current gaze direction of the eyeball based on an eyeball tracking algorithm corresponding to the collected receive optical power value. The eyeball tracking algorithm corresponding to the receive optical power value includes a real-time running part and an offline training part. The one-to-one matching relationship between the plurality of eyeball gaze directions and the plurality of optical power reference values may be obtained through offline training, the optical power reference value that satisfies the specified functional relationship with the collected receive optical power value may be calculated through real-time running, and then the eyeball line-of-sight direction that matches the optical power reference value obtained through the real-time running part is determined as the current gaze direction of the eyeball based on the optical power reference value obtained through real-time running and the one-to-one matching relationship between the plurality of eyeball gaze directions and the plurality of optical power reference values that is obtained through offline training. In this application, the photoelectric detector collects a receive optical power, and the photoelectric detector is an optical power collection apparatus. In the prior art, a camera photographs a human eye, and the camera is an image collection apparatus. An optical power collection frequency of the photoelectric detector is far higher than an image collection frequency of the camera in the prior art. In this application, based on the illumination system including the illumination light source, the beam scanner, and the entrance pupil optical apparatus in the eyeball tracking system, the photoelectric detector is used to collect an optical power of the eyeball reflection light ray to perform eyeball tracking. Therefore, compared with the prior art, this application helps implement a low latency because of a higher collection frequency.

In a possible design, the eyeball tracking system further includes a display light source. The display light source is configured to transmit a display light ray to the beam scanner; the beam scanner is further configured to project the display light ray onto the entrance pupil optical apparatus; and the entrance pupil optical apparatus is further configured to reflect, reproduce, or refract the display light ray projected onto the entrance pupil optical apparatus, so that the reflected, reproduced, or refracted display light ray is imaged on a retina after passing through a pupil of the eyeball.

In the eyeball tracking system, the illumination light source, the beam scanner, and the entrance pupil optical apparatus constitute the illumination system for the eyeball, the display light source, the beam scanner, and the entrance pupil optical apparatus constitute a retinal projection system for the eyeball, and an illumination optical path along which the illumination light ray illuminates the eyeball is obtained by reusing an optical path along which a display light ray is imaged on the retina of the eyeball after being projected by the beam scanner and the entrance pupil optical apparatus. The eyeball tracking system can be obtained by adding the illumination light source and the photoelectric detector to an existing retinal projection system, and the eyeball tracking system not only can implement an eyeball tracking function, but also has a retinal projection and imaging function.

In a possible design, a first functional film is disposed on the entrance pupil optical apparatus. The first functional film is configured to reflect, reproduce, or refract the illumination light ray projected onto the entrance pupil optical apparatus, so that the reflected, reproduced, or refracted illumination light ray covers the eyeball at a preset angle, where a wavelength of the illumination light ray is in a first band; and the first functional film is further configured to reflect, reproduce, or refract the display light ray projected onto the entrance pupil optical apparatus, so that the reflected, reproduced, or refracted display light ray is imaged on the retina after passing through the pupil of the eyeball, where a wavelength of the display light ray is in a second band, and there is no intersection between the first band and the second band.

A functional film on the prior-art entrance pupil optical apparatus can only reflect a display light ray projected onto the entrance pupil optical apparatus, and the reflected display light ray is imaged on the retina after passing through the pupil of the eyeball. Compared with the existing retinal projection system, in this application, the first functional film disposed on the entrance pupil optical apparatus in the eyeball tracking system can reflect, reproduce, or refract the display light ray and the illumination light ray at different levels. The first functional film can reflect, reproduce, or refract the display light ray projected onto the entrance pupil optical apparatus, so that the reflected, reproduced, or refracted display light ray is imaged on the retina after passing through the pupil of the eyeball; and can also reflect, reproduce, or refract the illumination light ray projected onto the entrance pupil optical apparatus, so that the reflected, reproduced, or refracted illumination light ray covers the eyeball at the preset angle.

In a possible design, the first functional film includes a first curved-surface reflection film and a second curved-surface reflection film that are disposed in a stacked manner. Curvature of the first curved-surface reflection film is greater than curvature of the second curved-surface reflection film, and both the first curved-surface reflection film and the second curved-surface reflection film can reflect a light ray that is in a selective band; the first curved-surface reflection film is of a monolayer film structure, and the first curved-surface reflection film is configured to reflect the illumination light ray; and the second curved-surface reflection film is configured to reflect the display light ray.

It should be noted that both the first curved-surface reflection film and the second curved-surface reflection film can reflect a light ray that is in a selective band. That is, both the first curved-surface reflection film and the second curved-surface reflection film can reflect a light ray with a selective wavelength. In other words, the first curved-surface reflection film and the second curved-surface reflection film cannot reflect all light rays, but can reflect a light ray with a wavelength in a specified band instead of a light ray with a wavelength outside the specified band. In this embodiment, the first curved-surface reflection film can reflect the illumination light ray with the wavelength in the first band, and the second curved-surface reflection film can reflect the display light ray with a wavelength in the second band.

In a possible design, the first functional film includes a first holographic film and a second holographic film that are stacked. The first holographic film is configured to reproduce the received illumination light ray, to generate reproduced light corresponding to the received illumination light ray; and the second holographic film includes a first holographic sub-film, a second holographic sub-film, and a third holographic sub-film that are stacked, and the second band includes a first sub-band, a second sub-band, and a third sub-band. The first holographic sub-film is configured to reproduce a received display light ray that is in the first sub-band, to generate first reproduced light; the second holographic sub-film is configured to reproduce a received display light ray that is in the second sub-band, to generate second reproduced light; and the third holographic sub-film is configured to reproduce a received display light ray that is in the third sub-band, to generate third reproduced light.

It should be noted that the holographic film described in this application is a micro-nano thin film, and a refractive index and/or light transmittance of the holographic film is variable. Specifically, the first holographic film is made by performing exposing processing on an optical polymer substrate based on an interference fringe with a wavelength of the illumination light ray; and the second holographic film is made by performing exposing processing on an optical polymer substrate based on an interference fringe with a wavelength of the display light ray.

It should be further noted that the first holographic sub-film is made by performing exposing processing on the optical polymer substrate based on an interference fringe with a wavelength of the display light ray that is in the first sub-band; the second holographic sub-film is made by performing exposing processing on the optical polymer substrate based on an interference fringe with a wavelength of the display light ray that is in the second sub-band; and the third holographic sub-film is made by performing exposing processing on the optical polymer substrate based on an interference fringe with a wavelength of the display light ray that is in the third sub-band.

A holographic interference fringe of the first holographic film reproduces the received illumination light ray, and generates reproduced light corresponding to the illumination light ray; a holographic interference fringe of the first holographic sub-film reproduces the received display light ray that is in the first sub-band, and generates first reproduced light; a holographic interference fringe of the second holographic sub-film reproduces the received display light ray that is in the second sub-band, and generates second reproduced light; and a holographic interference fringe of the third holographic sub-film reproduces the received display light ray that is in the third sub-band, and generates third reproduced light. The generated reproduced light corresponding to the received illumination light ray illuminates the eyeball, and the generated first reproduced light, second reproduced light, and third reproduced light are imaged on the retina after passing through the pupil of the eyeball.

In a possible design, the first functional film includes a first diffraction optical waveguide micro-nano structure and a second diffraction optical waveguide micro-nano structure that are stacked. The first diffraction optical waveguide micro-nano structure is configured to diffract the illumination light ray; and the second diffraction optical waveguide micro-nano structure includes a first diffraction optical waveguide micro-nano sub-structure, a second diffraction optical waveguide micro-nano sub-structure, and a third diffraction optical waveguide micro-nano sub-structure that are stacked, and the second band includes a first sub-band, a second sub-band, and a third sub-band. The first diffraction optical waveguide micro-nano sub-structure is configured to diffract the received display light ray that is in the first sub-band, to generate first refracted light; the second diffraction optical waveguide micro-nano sub-structure is configured to diffract the received display light ray that is in the second sub-band, to generate second refracted light; and the third diffraction optical waveguide micro-nano sub-structure is configured to diffract the received display light ray that is in the third sub-band, to generate third refracted light.

It should be noted that the first functional film in this application is a micro-nano waveguide structure, and a refractive index and/or light transmittance of the waveguide structure is variable. Specifically, the first diffraction optical waveguide micro-nano structure is made by performing exposing processing on an optical polymer substrate based on a diffraction fringe with a wavelength of the illumination light ray; and the second diffraction optical waveguide micro-nano structure is made by performing exposing processing on an optical polymer substrate based on a diffraction fringe with a wavelength of the display light ray.

It should be further noted that the first diffraction optical waveguide micro-nano sub-structure is made by performing exposing processing on the optical polymer substrate based on a diffraction fringe with a wavelength of the display light ray that is in the first sub-band, the second diffraction optical waveguide micro-nano sub-structure is made by performing exposing processing on the optical polymer substrate based on a diffraction fringe with a wavelength of the display light ray that is in the second sub-band, and the third diffraction optical waveguide micro-nano sub-structure is made by performing exposing processing on the optical polymer substrate based on a diffraction fringe with a wavelength of the display light ray that is in the third sub-band.

It should be further noted that a diffraction fringe of the first diffraction optical waveguide micro-nano structure refracts or reflects the received illumination light ray, and generates refracted light corresponding to the received illumination light ray, and the generated refracted light corresponding to the received illumination light ray illuminates the eyeball; a diffraction fringe of the first diffraction optical waveguide micro-nano sub-structure refracts or reflects the received display light ray that is in the first sub-band, and generates first refracted light, and the generated first refracted light is imaged on the retina after passing through the pupil of the eyeball; a diffraction fringe of the second diffraction optical waveguide micro-nano sub-structure refracts or reflects the received display light ray that is in the second sub-band, and generates second refracted light, and the generated second refracted light is imaged on the retina after passing through the pupil of the eyeball; and a diffraction fringe of the third diffraction optical waveguide micro-nano sub-structure refracts or reflects the received display light ray that is in the third sub-band, and generates third refracted light, and the generated third refracted light is imaged on the retina after passing through the pupil of the eyeball.

In a possible design, the display light ray is modulated light of three types of monochromatic light: red light, green light, and blue light. A wavelength of the display light ray includes wavelengths of the three types of monochromatic light, where a wavelength of the red light is in the first sub-band, a wavelength of the green light is in the second sub-band, and a wavelength of the blue light is in the third sub-band.

In a possible design, the illumination light ray is infrared or near-infrared light, and a wavelength of the infrared or near-infrared light is in the first band.

In a possible design, the illumination light source and the display light source are integrally packaged.

In a possible design, a light source including the integrally packaged illumination light source and display light source is an integrally packaged multi-resonant-cavity pump laser that transmits red, green, and blue laser light and infrared or near-infrared laser light.

In a possible design, a light source including the integrally packaged illumination light source and display light source is obtained by integrally packaging a semiconductor laser chip that transmits infrared or near-infrared laser light and a semiconductor laser chip that transmits red, green, and blue laser light.

In a possible design, a light source including the integrally packaged illumination light source and display light source is obtained by integrally packaging a light-emitting diode that transmits infrared or near-infrared laser light and a light-emitting diode that transmits red, green, and blue laser light.

In a possible design, the display light source is electrically connected to the controller; the controller is configured to send a first instruction signal to the display light source, where the first instruction signal is used to instruct the display light source to obtain K pixels in an $M^{th}$ frame of image through modulation within the $M^{th}$ modulation cycle, where M is an integer greater than or equal to 1, and K is an integer greater than or equal to 1; and the display light source is configured to: receive the first instruction signal, obtain the K pixels through modulation within the $M^{th}$ modulation cycle according to the first instruction signal, and output modulated light corresponding to the K pixels, where the modulated light corresponding to all of the K pixels is the display light ray. For different values of M, a time interval between a modulation time point of a $P^{th}$ pixel in the K pixels and a start modulation time point of the $M^{th}$ modulation cycle is constant, where P is an integer greater than or equal to 1 and less than or equal to K.

It should be noted that if a start modulation time point of the $1^{st}$ modulation cycle is $T_{11}$, and modulation time points corresponding to the K pixels are $T_{11}, T_{12}, T_{13}, \ldots,$ and $T_{1K}$, a time interval between the start modulation time point $T_{11}$ and each of $T_{12}, T_{13}, \ldots,$ and $T_{1K}$ is constant.

It should be further noted that if a time interval between a modulation time point of the $P^{th}$ pixel within the $1^{st}$ modulation cycle and the start modulation time point of the $1^{st}$ modulation cycle is $T_{1P}$-$T_{11}$, and a time interval between a modulation time point of the $P^{th}$ pixel within the $2^{nd}$ modulation cycle and a start modulation time point of the $2^{nd}$ modulation cycle is $T_{2P}$-$T_{21}$, $T_{1P}$-$T_{11}$=$T_{2P}$-$T_{21}$, where P is an integer greater than or equal to 1 and less than or equal to K.

In a possible design, the beam scanner is electrically connected to the controller; the controller is configured to send a second instruction signal to the beam scanner, where the second instruction signal is used to instruct the beam scanner to scan, within the $M^{th}$ modulation cycle, the modulated light corresponding to the K pixels in the $M^{th}$ frame of image; and the beam scanner is configured to: receive the second instruction signal, scan, within the $M^{th}$ modulation cycle according to the second instruction signal, the modulated light corresponding to the K pixels, and project, onto the entrance pupil optical apparatus, the scanned modulated light corresponding to the K pixels.

It should be noted that duration within which modulated light corresponding to K pixels in any frame of image are scanned by the beam scanner is one scanning cycle, the beam scanner scans the $M^{th}$ frame of image within the $M^{th}$ scanning cycle, duration of each scanning cycle of the beam scanner is equal to duration of each modulation cycle of the display light source, each scanning cycle is corresponding to one modulation cycle, and a time interval between a start scanning time point of each scanning cycle and a start modulation time point of a corresponding modulation cycle is equal to a time interval between a last scanning time point of the scanning cycle and a last modulation time point of the corresponding modulation cycle.

In a possible design, the illumination light source is electrically connected to the controller; the controller is further configured to send a third instruction signal to the illumination light source, where the third instruction signal is used to instruct the illumination light source to transmit the illumination light ray, and the illumination light ray transmitted by the illumination light source within each modulation cycle includes W illumination time points, where the modulation cycle is a modulation cycle of the display light source; within all modulation cycles, there is a same time interval between a $Z^{th}$ illumination time point and a start modulation time point of the modulation cycle including the $Z^{th}$ illumination time point; Z is an integer greater than or equal to 1 and less than or equal to W; and W is a positive integer greater than or equal to K; the illumination light source is configured to: receive the third instruction signal, and transmit the illumination light ray to the beam scanner according to the third instruction signal; and the beam scanner is further configured to: scan the illumination light ray according to the second instruction signal synchronously while scanning the K pixels, and project the scanned illumination light ray onto the entrance pupil optical apparatus.

It should be noted that when W is equal to K, the illumination light source provides an illumination light ray when the display light source modulates each of the K pixels.

It should be noted that when W is greater than K, the illumination light source provides an illumination light ray when the display light source modulates each of the K pixels, and the illumination light source may also provide an illumination light ray when the display light source modulates a pixel other than the K pixels.

It should be noted that the illumination light source may alternatively transmit an illumination light ray all the time, regardless of whether the display light source modulates the K pixels or the display light source modulates a pixel other than the K pixels.

It should be noted that if a time interval between a $Z^{th}$ illumination time point $T_{1Z}$ and the start modulation time point $T_{11}$ of the $1^{st}$ modulation cycle is $T_{1Z}$-$T_{11}$ within the $1^{st}$ modulation cycle, and a time interval between the $Z^{th}$ illumination time point $T_{2Z}$ and the start modulation time point $T_{21}$ of the $2^{nd}$ modulation cycle is $T_{2Z}$-$T_{21}$ within the $2^{nd}$ modulation cycle is $T_{2Z}$-$T_{21}$, $T_{1Z}$-$T_{11}$=$T_{2Z}$-$T_{21}$.

In a possible design, the controller is further configured to send a fourth instruction signal to the photoelectric detector, where the fourth instruction signal is used to instruct the photoelectric detector to collect J receive optical power values within the $H^{th}$ detection cycle, where H is an integer greater than or equal to 1, and J is an integer greater than or equal to 1; and the photoelectric detector is configured to: receive the fourth instruction signal, and collect the J receive optical power values within the $H^{th}$ detection cycle according to the fourth instruction signal, so that the controller determines the current gaze direction of the eyeball based on the J receive optical power values collected by the photoelectric detector within the $H^{th}$ detection cycle, where for different values of H, a time interval between a collection time point of the $L^{th}$ receive optical power value in the J receive optical power values and a start collection time point of the $H^{th}$ detection cycle is constant, where L is an integer greater than or equal to 1 and less than or equal to J.

It should be noted that if a start collection time point of the $1^{st}$ detection cycle is $T_{11}$, and collection time points corresponding to the J receive optical power values are $T_{11}$, $T_{12}$, $T_{13}$, . . . , and $T_{1J}$, a time interval between the start collection time point $T_{11}$ and each of $T_{12}$, $T_{13}$, . . . , and $T_{1J}$ is constant.

It should be further noted that if a time interval between a collection time point of the $L^{th}$ pixel within the $1^{st}$ detection cycle and the start collection time point of the $1^{st}$ detection cycle is $T_{1L}$-$T_{11}$, and a time interval between a collection time point of the $L^{th}$ pixel within the $2^{nd}$ detection cycle and a start collection time point of the $2^{nd}$ detection cycle is $T_{2L}$-$T_{21}$, $T_{1L}$-$T_{11}$=$T_{2L}$-$T_{21}$.

In a possible design, duration of the detection cycle is equal to duration of the modulation cycle, each detection cycle is corresponding to one modulation cycle, and a start collection time point of each detection cycle is the same as a start modulation time point of the corresponding modulation cycle; and within any detection cycle, a fixed time interval between a collection time point of the $L^{th}$ receive optical power value in the J receive power values collected by the photoelectric detector and a start collection time point of the detection cycle is a first time interval, a fixed interval between a modulation time point of a pixel obtained by the display light source through modulation at the collection time point and a start modulation time point of a modulation cycle of the pixel is a second time interval, and the first time interval is equal to the second time interval.

For example, the $1^{st}$ modulation cycle is corresponding to the $1^{st}$ detection cycle, both the start modulation time point of the $1^{st}$ modulation cycle and the start collection time point of the $1^{st}$ detection cycle are $T_O$ within the $1^{st}$ detection cycle, a fixed time interval between a collection time point TL of the $L^{th}$ receive optical power value in the J receive power values collected by the photoelectric detector and the start collection time point $T_O$ of the $1^{st}$ detection cycle is $T_L$-$T_O$, and a fixed interval between a modulation time point $T_L'$ of the $L^{th}$ pixel obtained by the display light source through modulation at the collection time point $T_L$ and the start modulation time point $T_O$ of the $1^{st}$ modulation cycle is $T_L$-$T_O$; in this case, $T_L$-$T_O$=$T_L$-$T_O$.

In a possible design, duration of the detection cycle is greater than duration of the modulation cycle, duration of each detection cycle is equal to total duration of a plurality of consecutive modulation cycles, and a start collection time point of each detection cycle is the same as a corresponding earliest start modulation time point in the plurality of consecutive modulation cycles; and within any detection cycle, a fixed time interval between a collection time point of the $L^{th}$ receive optical power value in the J receive power values collected by the photoelectric detector and a start collection time point of the detection cycle is a third time interval, a fixed interval between a modulation time point of a pixel obtained by the display light source through modulation at the collection time point $T_L$ and a start modulation time point of a modulation cycle of the pixel is a fourth time interval, and the third time interval is equal to the fourth time interval.

In a possible design, duration of each detection cycle is equal to total duration of F1 consecutive modulation cycles, where F1 is an integer greater than or equal to 2.

In a possible design, duration of each of a plurality of detection cycles is equal to total duration of a plurality of consecutive modulation cycles, and the plurality of modulation cycles include at least a first detection cycle and a second detection cycle. Duration of the first detection cycle is equal to total duration of F2 consecutive modulation cycles, and duration of the second detection cycle is equal to total duration of F3 consecutive modulation cycles, where both F2 and F3 are integers greater than or equal to 2, and F2 is not equal to F3.

In a possible design, the controller is configured to: receive the J receive optical power values collected by the photoelectric detector within the $H^{th}$ detection cycle; obtain a transmit optical power value corresponding to each of the J receive optical power values, where the transmit optical power value is an optical power value of an illumination light ray transmitted by the illumination light source at a collection time point of the receive optical power value; determine an optical power reference value for the $H^{th}$ detection cycle based on the transmit optical power value and the receive optical power value, where the optical power reference value is a ratio of each of the J receive optical power values to the corresponding transmit optical power value; determine, in prestored optical power reference values for all of a plurality of detection cycles, an optical power reference value for a target detection cycle that has a highest similarity to the optical power reference value for the $H^{th}$ detection cycle, where the plurality of detection cycles include the target detection cycle; and determine, as the current gaze direction of the eyeball, an eyeball gaze direction corresponding to the prestored optical power reference value for the target detection cycle.

It should be noted that each optical power reference value is corresponding to one collection time point, the optical power reference value for the $H^{th}$ detection cycle includes a correspondence between J optical power reference values for the $H^{th}$ detection cycle and collection time points of corresponding receive optical power reference values. That is, there is a one-to-one correspondence between the J optical power reference values and the J collection time points. A prestored optical power reference value for each detection cycle includes a one-to-one correspondence between J collection time points and J optical power reference values of each detection cycle. That the optical power reference value for the target detection cycle has a highest similarity to the optical power reference value for the $H^{th}$ detection cycle means that a correspondence between J collection time points and J optical power reference values of the target detection cycle has a highest similarity to the correspondence between the J collection time points and the J optical power reference values of the $H^{th}$ detection cycle. A one-to-one correspondence between J optical power reference value and J collection time points of any detection cycle may also be understood as a curve in which the J optical power reference values collected sequentially within the detection cycle change at the J collection time points.

In a possible design, the controller is configured to: obtain the J receive optical power values that are collected within the $H^{th}$ detection cycle and that are sent by the photoelectric detector; determine an optical power reference value for the $H^{th}$ detection cycle based on the J receive optical power values, where the optical power reference value is a largest receive optical power value in the J receive optical power values; determine a first correspondence between the optical power reference value for the $H^{th}$ detection cycle of the detection cycles and a corresponding collection time point; determine, in a plurality of prestored correspondences, a second correspondence that has a highest similarity to the first correspondence, where the plurality of correspondences are correspondences between the optical power reference values for all of a plurality of detection cycles and corresponding collection time points; and determine an eyeball gaze direction corresponding to the prestored second correspondence as the current gaze direction of the eyeball.

In a possible design, when the eyeball tracking system includes no display light source, a second functional film is disposed on the entrance pupil optical apparatus. The second functional film is configured to reflect, reproduce, or refract the illumination light ray projected onto the entrance pupil optical apparatus, so that the reflected, reproduced, or refracted illumination light ray covers the eyeball at a preset angle, where a wavelength of the illumination light ray is in a first band.

In a possible design, the second functional film is a curved-surface reflection film capable of reflecting the illumination light ray that is in the first band.

In a possible design, the second functional film is a holographic film capable of reproducing the projected illumination light ray.

In a possible design, the second functional film is a diffraction optical waveguide micro-nano structure capable of refracting or reflecting the illumination light ray that is in the first band.

In a possible design, the illumination light ray is infrared or near-infrared light, and a wavelength of the infrared or near-infrared light is in the first band.

In a possible design, when the eyeball tracking system includes no display light source, the illumination light source is a resonant-cavity pump laser that transmits infrared or near-infrared laser light.

In a possible design, when the eyeball tracking system includes no display light source, the illumination light source is a semiconductor laser chip that transmits infrared or near-infrared laser light.

In a possible design, when the eyeball tracking system includes no display light source, the illumination light source is a light-emitting diode that transmits infrared or near-infrared light.

In a possible design, when the eyeball tracking system includes no display light source, the illumination light source is electrically connected to the controller; the controller is further configured to send a fifth instruction signal to the illumination light source, where the fifth instruction signal is used to instruct the illumination light source to transmit the illumination light ray; and the illumination light source is configured to: receive the fifth instruction signal, and transmit the illumination light ray to the beam scanner according to the fifth instruction signal.

In a possible design, when the eyeball tracking system includes no display light source, the photoelectric detector is electrically connected to the controller; the controller is further configured to send a sixth instruction signal to the photoelectric detector, where the sixth instruction signal is used to instruct the photoelectric detector to collect J receive optical power values within the $H'^{th}$ detection cycle, where H' is an integer greater than or equal to 1, and J is an integer greater than or equal to 1; and the photoelectric detector is configured to: receive the sixth instruction signal, and collect the J receive optical power values within the $H'^{th}$ detection cycle according to the sixth instruction signal, so that the controller determines the current gaze direction of the eyeball based on the J receive optical power values collected by the photoelectric detector within the $H'^{th}$ detection cycle, where for different values of H', a time interval between a collection time point of the $L^{th}$ receive optical power value in the J receive optical power values and a start collection time point of the $H^{th}$ detection cycle is constant, where L is an integer greater than or equal to 1 and less than or equal to J.

In a possible design, when the eyeball tracking system includes no display light source, the beam scanner is electrically connected to the controller; the controller is configured to send a seventh instruction signal to the beam scanner, where the seventh instruction signal is used to instruct the beam scanner to scan the illumination light ray within the $H'^{th}$ detection cycle; and the beam scanner is configured to: receive the seventh instruction signal, scan the illumination light ray within the $H'^{th}$ detection cycle according to the seventh instruction signal, and project the scanned illumination light ray onto the entrance pupil optical apparatus.

In a possible design, the illumination light ray transmitted by the illumination light source within each detection cycle includes W illumination time points. Within any detection cycle, a time interval between the $F^{th}$ illumination time point in the W illumination time points and an earliest illumination time point in the W illumination time points is equal to a time interval between a collection time point of the $L^{th}$ receive optical power value collected by the photoelectric detector within the detection cycle and a start collection time point of the detection cycle.

In a possible design, when the eyeball tracking system includes no display light source, the controller is configured to: receive the J receive optical power values collected by the photoelectric detector within the $H'^{th}$ detection cycle; obtain a transmit optical power value corresponding to each of the J receive optical power values, where the transmit optical power value is an optical power value of an illumination light ray transmitted by the illumination light source at a collection time point of the receive optical power value; determine an optical power reference value for the $H'^{th}$ detection cycle based on the transmit optical power value and the receive optical power value, where the optical power reference value is a ratio of each of the J receive optical power values to the corresponding transmit optical power value; determine, in prestored optical power reference values for all of a plurality of detection cycles, an optical power reference value for a target detection cycle that has a highest similarity to the optical power reference value for the $H'^{th}$ detection cycle, where the plurality of detection cycles include the target detection cycle; and determine, as the current gaze direction of the eyeball, an eyeball gaze direction corresponding to the prestored optical power reference value for the target detection cycle.

In a possible design, when the eyeball tracking system includes no display light source, the controller is configured to: obtain the J receive optical power values that are collected within the $H'^{th}$ detection cycle and that are sent by the photoelectric detector; determine an optical power reference value for the $H'^{th}$ detection cycle based on the J receive optical power values, where the optical power reference value is a largest receive optical power value in the J receive optical power values; determine a first correspondence between the optical power reference value for the $H'^{th}$ detection cycle of the detection cycles and a corresponding collection time point; determine, in a plurality of prestored correspondences, a second correspondence that has a highest similarity to the first correspondence, where the plurality of correspondences are correspondences between the optical power reference values for all of a plurality of detection cycles and corresponding collection time points; and determine an eyeball gaze direction corresponding to the prestored second correspondence as the current gaze direction of the eyeball.

According to a second aspect, this application provides an eyeball tracking system, including: an illumination light source, a beam scanner, a photoelectric detector, and a controller. The controller is electrically connected to the photoelectric detector; the illumination light source is configured to transmit an illumination light ray to the beam scanner; the beam scanner is configured to project the illumination light ray, so that the projected illumination light ray illuminates an eyeball at a preset angle; the photoelectric detector is configured to: collect a receive optical power value of an eyeball reflection light ray, and send the receive optical power value to the controller, where the eyeball reflection light ray is a light ray reflected by the eyeball when the projected illumination light ray illuminates the eyeball; and the controller is configured to: receive the receive optical power value sent by the photoelectric detector, determine, based on the receive optical power value, an optical power reference value that satisfies a specified functional relationship with the receive optical power value, and determine an eyeball line-of-sight direction that matches the optical power reference value as a current gaze direction of the eyeball based on a prestored one-to-one matching relationship between a plurality of eyeball gaze directions and a plurality of optical power reference values.

In the eyeball tracking system, some of illumination light rays are reflected by the eyeball when an illumination system including the illumination light source and the beam scanner in the eyeball tracking system illuminates the eyeball. The illumination light rays reflected by the eyeball are referred to as eyeball reflection light rays. Because different appearances of an eyeball surface that are present when the eyeball of the human eye gazes at different directions lead to different reflection angles for an illumination light ray, different eyeball gaze directions are corresponding to different eyeball reflection light rays. In this application, the photoelectric detector collects the receive optical power value of the eyeball reflection light ray, and determines the current gaze direction of the eyeball based on an eyeball tracking algorithm corresponding to the collected receive optical power value. The eyeball tracking algorithm corresponding to the receive optical power value includes a real-time running part and an offline training part. The one-to-one matching relationship between the plurality of eyeball gaze directions and the plurality of optical power reference values may be obtained through offline training, the optical power reference value that satisfies the specified functional relationship with the collected receive optical power value may be calculated through real-time running, and then the eyeball line-of-sight direction that matches the optical power reference value obtained through the real-time running part is determined as the current gaze direction of the eyeball based on the optical power reference value obtained through real-time running and the one-to-one matching relationship between the plurality of eyeball gaze directions and the plurality of optical power reference values that is obtained through offline training. In this application, the photoelectric detector collects a receive optical power, and the photoelectric detector is an optical power collection apparatus. In the prior art, a camera photographs a human eye, and the camera is an image collection apparatus. An optical power collection frequency of the photoelectric detector is far higher than an image collection frequency of the camera in the prior art. In this application, based on the illumination system including the illumination light source and the beam scanner in the eyeball tracking system, the photoelectric detector is used to collect an optical power of the eyeball reflection light ray to perform eyeball tracking. Therefore, compared with the prior art, this application helps implement a low latency because of a higher collection frequency.

In a possible design, the illumination light ray is infrared or near-infrared light.

In a possible design, the illumination light source is electrically connected to the controller; the controller is further configured to send an eighth instruction signal to the illumination light source, where the eighth instruction signal is used to instruct the illumination light source to transmit the illumination light ray; and the illumination light source is configured to: receive the eighth instruction signal, and transmit the illumination light ray to the beam scanner according to the eighth instruction signal.

In a possible design, the photoelectric detector is electrically connected to the controller; the controller is further configured to send a ninth instruction signal to the photoelectric detector, where the ninth instruction signal is used to instruct the photoelectric detector to collect J receive optical power values within the $H'^{th}$ detection cycle, where H' is an integer greater than or equal to 1, and J is an integer greater than or equal to 1; and the photoelectric detector is configured to: receive the ninth instruction signal, and collect the J receive optical power values within the $H'^{th}$ detection cycle according to the ninth instruction signal, so that the controller determines the current gaze direction of the eyeball based on the J receive optical power values collected by the photoelectric detector within the $H'^{th}$ detection cycle, where for different values of H', a time interval between a collection time point of the $L^{th}$ receive optical power value in the J receive optical power values and a start collection time point of the $H'^{th}$ detection cycle is constant, where L is an integer greater than or equal to 1 and less than or equal to J.

In a possible design, the beam scanner is electrically connected to the controller; the controller is configured to send a tenth instruction signal to the beam scanner, where the tenth instruction signal is used to instruct the beam scanner to scan the illumination light ray within the $H'^{th}$ detection cycle; and the beam scanner is configured to: receive the tenth instruction signal, scan the illumination light ray within the $H'^{th}$ detection cycle according to the tenth instruction signal, and project the scanned illumination light ray, so that the projected illumination light ray illuminates the eyeball at a preset angle.

In a possible design, the illumination light ray transmitted by the illumination light source within each detection cycle includes W illumination time points. Within any detection cycle, a time interval between the $F^{th}$ illumination time point in the W illumination time points and an earliest illumination time point in the W illumination time points is equal to a time interval between a collection time point of the $L^{th}$ receive optical power value collected by the photoelectric detector within the detection cycle and a start collection time point of the detection cycle.

In a possible design, the controller is configured to: receive the J receive optical power values collected by the photoelectric detector within the $H'^{th}$ detection cycle; obtain a transmit optical power value corresponding to each of the J receive optical power values, where the transmit optical power value is an optical power value of an illumination light ray transmitted by the illumination light source at a collection time point of the receive optical power value; determine an optical power reference value for the $H'^{th}$ detection cycle based on the transmit optical power value and the receive optical power value, where the optical power reference value is a ratio of each of the J receive optical power values to the corresponding transmit optical power value; determine, in prestored optical power reference values for all of a plurality of detection cycles, an optical power reference value for a target detection cycle that has a highest similarity to the optical power reference value for the $H'^{th}$ detection cycle, where the plurality of detection cycles include the target detection cycle; and determine, as the current gaze direction of the eyeball, an eyeball gaze direction corresponding to the prestored optical power reference value for the target detection cycle.

It should be noted that each optical power reference value is corresponding to one collection time point, the optical power reference value for the $H'^{th}$ detection cycle includes a correspondence between J optical power reference values for the $H'^{th}$ detection cycle and collection time points of corresponding receive optical power reference values. That is, there is a one-to-one correspondence between the J optical power reference values and the J collection time points. A prestored optical power reference value for each detection cycle includes a one-to-one correspondence between J collection time points and J optical power reference values of each detection cycle. That the optical power reference value for the target detection cycle has a highest similarity to the optical power reference value for the $H'^{th}$ detection cycle means that a correspondence between J collection time points and J optical power reference values of the target detection cycle has a highest similarity to the correspondence between the J collection time points and the J optical power reference values of the $H'^{th}$ detection cycle. A one-to-one correspondence between J optical power reference value and J collection time points of any detection cycle may also be understood as a curve in which the J optical power reference values collected sequentially within the detection cycle change at the J collection time points.

In a possible design, the controller is configured to: obtain the J receive optical power values that are collected within the $H'^{th}$ detection cycle and that are sent by the photoelectric detector; determine an optical power reference value for the $H'^{th}$ detection cycle based on the J receive optical power values, where the optical power reference value is a largest value in the J receive optical power values; determine a first correspondence between the optical power reference value for the $H'^{th}$ detection cycle and a corresponding collection time point; determine, in a plurality of prestored correspondences, a second correspondence that has a highest similarity to the first correspondence, where the plurality of correspondences are correspondences between the optical power reference values for all of a plurality of detection cycles and corresponding collection time points; and determine an eyeball gaze direction corresponding to the prestored second correspondence as the current gaze direction of the eyeball.

According to a third aspect, this application provides an eyeball tracking method applied to the eyeball tracking system according to the first aspect. The method includes: transmitting, by an illumination light source, an illumination light ray to a beam scanner; projecting, by the beam scanner, the illumination light ray onto an entrance pupil optical apparatus, so that the entrance pupil optical apparatus reflects or reproduces the illumination light ray, and the reflected or reproduced illumination light ray illuminates an eyeball; collecting, by a photoelectric detector, a receive optical power value of an eyeball reflection light ray, and sending the receive optical power value to a controller, where the eyeball reflection light ray is a light ray reflected by the eyeball when the reflected or reproduced illumination light ray illuminates the eyeball; and receiving, by the controller, the receive optical power value sent by the photoelectric detector, determining, based on the receive optical power value, an optical power reference value that satisfies a specified functional relationship with the receive optical power value, and determining an eyeball line-of-sight direction that matches the optical power reference value as a current gaze direction of the eyeball based on a prestored one-to-one matching relationship between a plurality of eyeball gaze directions and a plurality of optical power reference values.

In the eyeball tracking method, some of illumination light rays are reflected by the eyeball when an illumination system including the illumination light source, the beam scanner, and the entrance pupil optical apparatus in the eyeball tracking system illuminates the eyeball. The illumination light rays reflected by the eyeball are referred to as eyeball reflection light rays. Because different appearances of an eyeball surface that are present when the eyeball of the human eye gazes at different directions lead to different reflection angles for an illumination light ray, different eyeball gaze directions are corresponding to different eyeball reflection light rays. In this application, the photoelectric detector collects the receive optical power value of the eyeball reflection light ray, and determines the current gaze direction of the eyeball based on an eyeball tracking algorithm corresponding to the collected receive optical power value. The eyeball tracking algorithm corresponding to the receive optical power value includes a real-time running part and an offline training part. The one-to-one matching relationship between the plurality of eyeball gaze directions and the plurality of optical power reference values may be obtained through offline training, the optical power reference value that satisfies the specified functional relationship with the collected receive optical power value may be calculated through real-time running, and then the eyeball line-of-sight direction that matches the optical power reference value obtained through the real-time running part is determined as the current gaze direction of the eyeball based on the optical power reference value obtained through real-time running and the one-to-one matching relationship between the plurality of eyeball gaze directions and the plurality of optical power reference values that is obtained through offline training. In this application, the photoelectric detector collects a receive optical power, and the photoelectric detector is an optical power collection apparatus. In the prior art, a camera photographs a human eye, and the camera is an image collection apparatus. An optical power collection frequency of the photoelectric detector is far higher than an image collection frequency of the camera in the prior art. In this application, based on the illumination system including the illumination light source, the beam scanner, and the entrance pupil optical apparatus in the eyeball tracking system, the photoelectric detector is used to collect an optical power of the eyeball reflection light ray to perform eyeball tracking. Therefore, compared with the prior art, this application helps implement a low latency because of a higher collection frequency.

In a possible design, when the eyeball tracking system includes a display light source, the method further includes: transmitting, by the display light source, a display light ray to the beam scanner; projecting, by the beam scanner, the display light ray onto the entrance pupil optical apparatus; and reflecting or reproducing, by the entrance pupil optical apparatus, the display light ray projected onto the entrance pupil optical apparatus, so that the reflected or reproduced display light ray is imaged on a retina after passing through a pupil of the eyeball.

When the eyeball tracking system includes the display light source, the illumination light source, the beam scanner, and the entrance pupil optical apparatus constitute the illumination system for the eyeball, the display light source, the beam scanner, and the entrance pupil optical apparatus constitute a retinal projection system for the eyeball, and an illumination optical path along which the illumination light ray illuminates the eyeball is obtained by reusing an optical path along which a display light ray is imaged on the retina of the eyeball after being projected by the beam scanner and the entrance pupil optical apparatus. The eyeball tracking system can be obtained by adding the illumination light source and the photoelectric detector to an existing retinal projection system, and the eyeball tracking system not only can implement an eyeball tracking function, but also has a retinal projection and imaging function.

In a possible design, the transmitting, by the display light source, a display light ray to the beam scanner specifically includes: sending, by the controller, a first instruction signal to the display light source, where the first instruction signal is used to instruct the display light source to obtain K pixels in an $M^{th}$ frame of image through modulation within the $M^{th}$ modulation cycle, where M is an integer greater than or equal to 1, and K is an integer greater than or equal to 1; and receiving, by the display light source, the first instruction signal, obtaining the K pixels through modulation within the $M^{th}$ modulation cycle according to the first instruction signal, and outputting modulated light corresponding to the K pixels, where the modulated light corresponding to all of the K pixels is the display light ray, where for different values of M, a time interval between a modulation time point of a $P^{th}$ pixel in the K pixels and a start modulation time point of the $M^{th}$ modulation cycle is constant, where P is an integer greater than or equal to 1 and less than or equal to K.

In a possible design, the projecting, by the beam scanner, the display light ray onto the entrance pupil optical apparatus specifically includes: sending, by the controller, a second instruction signal to the beam scanner, where the second instruction signal is used to instruct the beam scanner to scan, within the $M^{th}$ modulation cycle, the modulated light corresponding to the K pixels in the $M^{th}$ frame of image; and receiving, by the beam scanner, the second instruction signal, scanning, within the $M^{th}$ modulation cycle according to the second instruction signal, the modulated light corresponding to the K pixels, and projecting, onto the entrance pupil optical apparatus, the scanned modulated light corresponding to the K pixels.

In a possible design, when the eyeball tracking system includes the display light source, the transmitting, by an illumination light source, an illumination light ray to a beam scanner specifically includes: sending, by the controller, a third instruction signal to the illumination light source, where the third instruction signal is used to instruct the illumination light source to transmit the illumination light ray; and receiving, by the illumination light source, the third instruction signal, and transmitting the illumination light ray to the beam scanner according to the third instruction signal, where the illumination light ray transmitted by the illumination light source within each modulation cycle includes W illumination time points; the modulation cycle is a modulation cycle of the display light source; within all modulation cycles, there is a same time interval between a $Z^{th}$ illumination time point and a start modulation time points of a modulation cycle including the $Z^{th}$ illumination time point are the same; Z is an integer greater than or equal to 1 and less than or equal to W; and W is a positive integer greater than or equal to K; and the projecting, by the beam scanner, the illumination light ray onto the entrance pupil optical apparatus includes: scanning, by the beam scanner, the illumination light ray according to the second instruction signal synchronously while scanning the K pixels, and projecting the scanned illumination light ray onto the entrance pupil optical apparatus.

In a possible design, when the eyeball tracking system includes the display light source, the collecting, by a photoelectric detector, a receive optical power value of an eyeball reflection light ray specifically includes: sending, by the controller, a fourth instruction signal to the photoelectric detector, where the fourth instruction signal is used to instruct the photoelectric detector to collect J receive optical power values within the $H^{th}$ detection cycle, where H is an integer greater than or equal to 1, and J is an integer greater than or equal to 1; and receiving, by the photoelectric detector, the fourth instruction signal, and collecting the J receive optical power values within the $H^{th}$ detection cycle according to the fourth instruction signal, so that the controller determines the current gaze direction of the eyeball based on the J receive optical power values collected by the photoelectric detector within the $H^{th}$ detection cycle, where for different values of H, a time interval between a collection time point of the $L^{th}$ receive optical power value in the J receive optical power values and a start collection time point of the $H^{th}$ detection cycle is constant, where L is an integer greater than or equal to 1 and less than or equal to J.

In a possible design, when the eyeball tracking system includes the display light source, duration of the detection cycle is equal to duration of the modulation cycle, each detection cycle is corresponding to one modulation cycle, and a start collection time point of each detection cycle is the same as a start modulation time point of the corresponding modulation cycle; and within any detection cycle, a fixed time interval between a collection time point of the $L^{th}$ receive optical power value in the J receive power values collected by the photoelectric detector and a start collection time point of the detection cycle is a first time interval, a fixed interval between a modulation time point of a pixel obtained by the display light source through modulation at the collection time point and a start modulation time point of a modulation cycle of the pixel is a second time interval, and the first time interval is equal to the second time interval.

In a possible design, when the eyeball tracking system includes the display light source, duration of the detection cycle is greater than duration of the modulation cycle, duration of each detection cycle is equal to total duration of a plurality of consecutive modulation cycles, and a start collection time point of each detection cycle is the same as a corresponding earliest start modulation time point in the plurality of consecutive modulation cycles; and within any detection cycle, a fixed time interval between a collection time point of the $L^{th}$ receive optical power value in the J receive power values collected by the photoelectric detector and a start collection time point of the detection cycle is a third time interval, a fixed interval between a modulation time point of a pixel obtained by the display light source through modulation at the collection time point and a start modulation time point of a modulation cycle of the pixel is a fourth time interval, and the third time interval is equal to the fourth time interval.

In a possible design, when the eyeball tracking system includes the display light source, the receiving, by the controller, the receive optical power value sent by the photoelectric detector, determining, based on the receive optical power value, an optical power reference value that satisfies a specified functional relationship with the receive optical power value, and determining an eyeball line-of-sight direction that matches the optical power reference value as a current gaze direction of the eyeball based on a prestored one-to-one matching relationship between a plurality of eyeball gaze directions and a plurality of optical power reference values, specifically includes: receiving, by the controller, the J receive optical power values collected by the photoelectric detector within the $H^{th}$ detection cycle; obtaining, by the controller, a transmit optical power value corresponding to each of the J receive optical power values, where the transmit optical power value is an optical power value of an illumination light ray transmitted by the illumination light source at a collection time point of the receive optical power value; determining, by the controller, an optical power reference value for the $H^{th}$ detection cycle based on the transmit optical power value and the receive optical power value, where the optical power reference value is a ratio of each of the J receive optical power values to the corresponding transmit optical power value; determining, by the controller from prestored optical power reference values for all of a plurality of detection cycles, an optical power reference value for a target detection cycle that has a highest similarity to the optical power reference value for the $H^{th}$ detection cycle, where the plurality of detection cycles include the target detection cycle; and determining, by the controller as the current gaze direction of the eyeball, an eyeball gaze direction corresponding to the prestored optical power reference value for the target detection cycle.

In a possible design, when the eyeball tracking system includes the display light source, the receiving, by the controller, the receive optical power value sent by the photoelectric detector, determining, based on the receive optical power value, an optical power reference value that satisfies a specified functional relationship with the receive optical power value, and determining an eyeball line-of-sight direction that matches the optical power reference value as a current gaze direction of the eyeball based on a prestored one-to-one matching relationship between a plurality of eyeball gaze directions and a plurality of optical power reference values, specifically includes: obtaining, by the controller, the J receive optical power values that are collected within the $H^{th}$ detection cycle and that are sent by the photoelectric detector; determining, by the controller, an optical power reference value for the $H^{th}$ detection cycle based on the J receive optical power values, where the optical power reference value is a largest value in the J receive optical power values; determining, by the controller, a first correspondence between the optical power reference value for the $H^{th}$ detection cycle and a corresponding collection time point; determining, by the controller in a plurality of prestored correspondences, a second correspondence that has a highest similarity to the first correspondence, where the plurality of correspondences are correspondences between the optical power reference values for all of a plurality of detection cycles and corresponding collection time points; and determining, by the controller, an eyeball gaze direction corresponding to the prestored second correspondence as the current gaze direction of the eyeball.

In a possible design, when the eyeball tracking system includes no display light source, the transmitting, by an illumination light source, an illumination light ray to a beam scanner specifically includes: sending, by the controller, a fifth instruction signal to the illumination light source, where the fifth instruction signal is used to instruct the illumination light source to transmit the illumination light ray; and receiving, by the illumination light source, the fifth instruction signal, and transmitting the illumination light ray to the beam scanner according to the fifth instruction signal.

In a possible design, when the eyeball tracking system includes no display light source, the collecting, by a photoelectric detector, a receive optical power value of an eyeball reflection light ray specifically includes: sending, by the controller, a sixth instruction signal to the photoelectric detector, where the sixth instruction signal is used to instruct the photoelectric detector to collect J receive optical power values within the $H'^{th}$ detection cycle, where H' is an integer greater than or equal to 1, and J is an integer greater than or equal to 1; and receiving, by the photoelectric detector, the sixth instruction signal, and collecting the J receive optical power values within the $H'^{th}$ detection cycle according to the sixth instruction signal, so that the controller determines the current gaze direction of the eyeball based on the J receive optical power values collected by the photoelectric detector within the $H'^{th}$ detection cycle, where for different values of H', a time interval between a collection time point of the $L^{th}$ receive optical power value in the J receive optical power values and a start collection time point of the $H^{th}$ detection cycle is constant, where L is an integer greater than or equal to 1 and less than or equal to J.

In a possible design, when the eyeball tracking system includes no display light source, the projecting, by the beam scanner, the illumination light ray onto the entrance pupil optical apparatus specifically includes: sending, by the controller, a seventh instruction signal to the beam scanner, where the seventh instruction signal is used to instruct the beam scanner to scan the illumination light ray within the $H'^{th}$ detection cycle; and receiving, by the beam scanner, the seventh instruction signal, scanning the illumination light ray within the $H'^{th}$ detection cycle according to the seventh instruction signal, and projecting the scanned illumination light ray onto the entrance pupil optical apparatus.

In a possible design, when the eyeball tracking system includes no display light source, the illumination light ray transmitted by the illumination light source within each detection cycle includes W illumination time points; and within any detection cycle, a time interval between the $F^{th}$ illumination time point in the W illumination time points and an earliest illumination time point in the W illumination time points is equal to a time interval between a collection time point of the $L^{th}$ receive optical power value collected by the photoelectric detector within the detection cycle and a start collection time point of the detection cycle.

In a possible design, when the eyeball tracking system includes no display light source, the receiving, by the controller, the receive optical power value sent by the photoelectric detector, determining, based on the receive optical power value, an optical power reference value that satisfies a specified functional relationship with the receive optical power value, and determining an eyeball line-of-sight direction that matches the optical power reference value as a current gaze direction of the eyeball based on a prestored one-to-one matching relationship between a plurality of eyeball gaze directions and a plurality of optical power reference values, specifically includes: receiving, by the controller, the J receive optical power values collected by the photoelectric detector within the $H'^{th}$ detection cycle; obtaining, by the controller, a transmit optical power value corresponding to each of the J receive optical power values, where the transmit optical power value is an optical power value of an illumination light ray transmitted by the illumination light source at a collection time point of the receive optical power value; determining, by the controller, an optical power reference value for the $H'^{th}$ detection cycle based on the transmit optical power value and the receive optical power value, where the optical power reference value is a ratio of each of the J receive optical power values to the corresponding transmit optical power value; determining, by the controller from prestored optical power reference values for all of a plurality of detection cycles, an optical power reference value for a target detection cycle that has a highest similarity to the optical power reference value for the $H'^{th}$ detection cycle, where the plurality of detection cycles include the target detection cycle; and determining, by the controller as the current gaze direction of the eyeball, an eyeball gaze direction corresponding to the prestored optical power reference value for the target detection cycle.

In a possible design, when the eyeball tracking system includes no display light source, the receiving, by the controller, the receive optical power value sent by the photoelectric detector, determining, based on the receive optical power value, an optical power reference value that satisfies a specified functional relationship with the receive optical power value, and determining an eyeball line-of-sight direction that matches the optical power reference value as a current gaze direction of the eyeball based on a prestored one-to-one matching relationship between a plurality of eyeball gaze directions and a plurality of optical power reference values, specifically includes: obtaining, by the controller, the J receive optical power values that are collected within the $H'^{th}$ detection cycle and that are sent by the photoelectric detector; determining, by the controller, an optical power reference value for the $H'^{th}$ detection cycle based on the J receive optical power values, where the optical power reference value is a largest value in the J receive optical power values; determining, by the controller, a first correspondence between the optical power reference value for the $H'^{th}$ detection cycle and a corresponding collection time point; determining, by the controller in a plurality of prestored correspondences, a second correspondence that has a highest similarity to the first correspondence, where the plurality of correspondences are correspondences between the optical power reference values for all of a plurality of detection cycles and corresponding collection time points; and determining, by the controller, an eyeball gaze direction corresponding to the prestored second correspondence as the current gaze direction of the eyeball.

According to a fourth aspect, this application provides an eyeball tracking method applied to the eyeball tracking system according to the second aspect. The method includes: transmitting, by an illumination light source, an illumination light ray to a beam scanner; projecting, by the beam scanner, the illumination light ray, so that the projected illumination light ray illuminates an eyeball at a preset angle; collecting, by a photoelectric detector, a receive optical power value of an eyeball reflection light ray, and sending the receive optical power value to a controller, where the eyeball reflection light ray is a light ray reflected by the eyeball when the projected illumination light ray illuminates the eyeball; and receiving, by the controller, the receive optical power value sent by the photoelectric detector, determining, based on the receive optical power value, an optical power reference value that satisfies a specified functional relationship with the receive optical power value, and determining an eyeball line-of-sight direction that matches the optical power reference value as a current gaze direction of the eyeball based on a prestored one-to-one matching relationship between a plurality of eyeball gaze directions and a plurality of optical power reference values.

In the eyeball tracking method, some of illumination light rays are reflected by the eyeball when an illumination system including the illumination light source and the beam scanner in the eyeball tracking system illuminates the eyeball. The illumination light rays reflected by the eyeball are referred to as eyeball reflection light rays. Because different appearances of an eyeball surface that are present when the eyeball of the human eye gazes at different directions lead to different reflection angles for an illumination light ray, different eyeball gaze directions are corresponding to different eyeball reflection light rays. In this application, the photoelectric detector collects the receive optical power value of the eyeball reflection light ray, and determines the current gaze direction of the eyeball based on an eyeball tracking algorithm corresponding to the collected receive optical power value. The eyeball tracking algorithm corresponding to the receive optical power value includes a real-time running part and an offline training part. The one-to-one matching relationship between the plurality of eyeball gaze directions and the plurality of optical power reference values may be obtained through offline training, the optical power reference value that satisfies the specified functional relationship with the collected receive optical power value may be calculated through real-time running, and then the eyeball line-of-sight direction that matches the optical power reference value obtained through the real-time running part is determined as the current gaze direction of the eyeball based on the optical power reference value obtained through real-time running and the one-to-one matching relationship between the plurality of eyeball gaze directions and the plurality of optical power reference values that is obtained through offline training. In this application, the photoelectric detector collects a receive optical power, and the photoelectric detector is an optical power collection apparatus. In the prior art, a camera photographs a human eye, and the camera is an image collection apparatus. An optical power collection frequency of the photoelectric detector is far higher than an image collection frequency of the camera in the prior art. In this application, based on the illumination system including the illumination light source and the beam scanner in the eyeball tracking system, the photoelectric detector is used to collect an optical power of the eyeball reflection light ray to perform eyeball tracking. Therefore, compared with the prior art, this application helps implement a low latency because of a higher collection frequency.

In a possible design, the transmitting, by an illumination light source, an illumination light ray to a beam scanner specifically includes: sending, by the controller, an eighth instruction signal to the illumination light source, where the eighth instruction signal is used to instruct the illumination light source to transmit the illumination light ray; and receiving, by the illumination light source, the eighth instruction signal, and transmitting the illumination light ray to the beam scanner according to the eighth instruction signal.

In a possible design, the collecting, by a photoelectric detector, a receive optical power value of an eyeball reflection light ray specifically includes: sending, by the controller, a ninth instruction signal to the photoelectric detector, where the ninth instruction signal is used to instruct the photoelectric detector to collect J receive optical power values within the $H'^{th}$ detection cycle, where H' is an integer greater than or equal to 1, and J is an integer greater than or equal to 1; and receiving, by the photoelectric detector, the ninth instruction signal, and collecting the J receive optical power values within the $H'^{th}$ detection cycle according to the ninth instruction signal, so that the controller determines the current gaze direction of the eyeball based on the J receive optical power values collected by the photoelectric detector within the $H'^{th}$ detection cycle, where for different values of H', a time interval between a collection time point of the $L^{th}$ receive optical power value in the J receive optical power values and a start collection time point of the $H'^{th}$ detection cycle is constant, where L is an integer greater than or equal to 1 and less than or equal to J.

In a possible design, the projecting, by the beam scanner, the illumination light ray specifically includes: the controller, configured to send a tenth instruction signal to the beam scanner, where the tenth instruction signal is used to instruct the beam scanner to scan the illumination light ray within the $H'^{th}$ detection cycle; and the beam scanner, configured to receive the tenth instruction signal, scan the illumination light ray within the $H'^{th}$ detection cycle according to the tenth instruction signal, and project the scanned illumination light ray, so that the projected illumination light ray illuminates the eyeball at a preset angle.

In a possible design, the illumination light ray transmitted by the illumination light source within each detection cycle includes W illumination time points. Within any detection cycle, a time interval between the $F^{th}$ illumination time point in the W illumination time points and an earliest illumination time point in the W illumination time points is equal to a time interval between a collection time point of the $L^{th}$ receive optical power value collected by the photoelectric detector within the detection cycle and a start collection time point of the detection cycle.

In a possible design, the receiving, by the controller, the receive optical power value sent by the photoelectric detector, determining, based on the receive optical power value, an optical power reference value that satisfies a specified functional relationship with the receive optical power value, and determining an eyeball line-of-sight direction that matches the optical power reference value as a current gaze direction of the eyeball based on a prestored one-to-one matching relationship between a plurality of eyeball gaze directions and a plurality of optical power reference values, specifically includes: receiving, by the controller, the J receive optical power values collected by the photoelectric detector within the $H'^{th}$ detection cycle; obtaining, by the controller, a transmit optical power value corresponding to each of the J receive optical power values, where the transmit optical power value is an optical power value of an illumination light ray transmitted by the illumination light source at a collection time point of the receive optical power value; determining, by the controller, an optical power reference value for the $H^{t\text{th}}$ detection cycle based on the transmit optical power value and the receive optical power value, where the optical power reference value is a ratio of each of the J receive optical power values to the corresponding transmit optical power value; determining, by the controller from prestored optical power reference values for all of a plurality of detection cycles, an optical power reference value for a target detection cycle that has a highest similarity to the optical power reference value for the $H^{t\text{th}}$ detection cycle, where the plurality of detection cycles include the target detection cycle; and determining, by the controller as the current gaze direction of the eyeball, an eyeball gaze direction corresponding to the prestored optical power reference value for the target detection cycle.

In a possible design, the receiving, by the controller, the receive optical power value sent by the photoelectric detector, determining, based on the receive optical power value, an optical power reference value that satisfies a specified functional relationship with the receive optical power value, and determining an eyeball line-of-sight direction that matches the optical power reference value as a current gaze direction of the eyeball based on a prestored one-to-one matching relationship between a plurality of eyeball gaze directions and a plurality of optical power reference values, specifically includes: obtaining the J receive optical power values that are collected within the $H^{t\text{th}}$ detection cycle and that are sent by the photoelectric detector; determining an optical power reference value for the $H^{t\text{th}}$ detection cycle based on the J receive optical power values, where the optical power reference value is a largest value in the J receive optical power values; determining a first correspondence between the optical power reference value for the $H^{t\text{th}}$ detection cycle and a corresponding collection time point; determining, in a plurality of prestored correspondences, a second correspondence that has a highest similarity to the first correspondence, where the plurality of correspondences are correspondences between the optical power reference values for all of a plurality of detection cycles and corresponding collection time points; and determining an eyeball gaze direction corresponding to the prestored second correspondence as the current gaze direction of the eyeball.

DESCRIPTION OF EMBODIMENTS

The following describes the embodiments provided in this application with reference to accompanying drawings.

Figure 1:
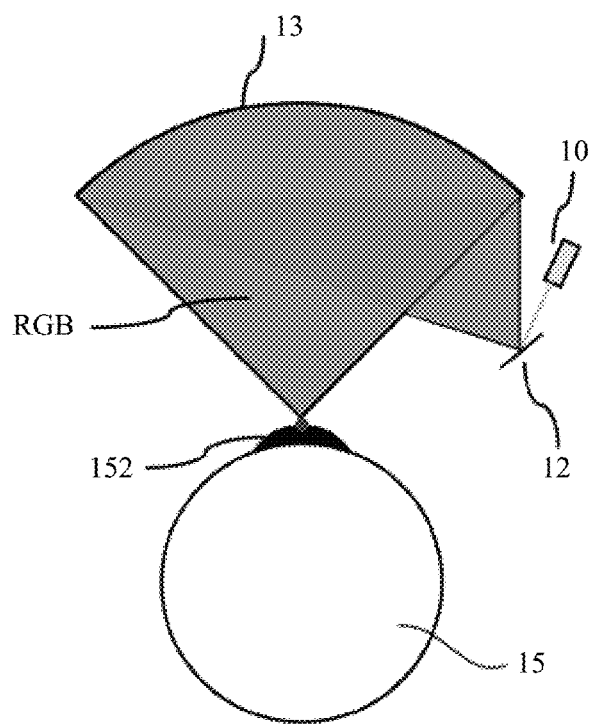
FIG. 1 is a schematic structural diagram of a scan-type retinal projection system according to the prior art.

This application provides a system architecture of a scan-type retinal projection system. A system architecture of a scan-type retinal projection system shown in FIG. 1 includes a red green blue (RGB) light source 10, a beam scanner 12, and an entrance pupil optical apparatus 13. A common RGB light source 10 is an RGB laser. Common beam scanners 12 include a micro electromechanical system (MEMS), an optical fiber scanner, and the like. A common entrance pupil optical apparatus 13 is a convex lens or a concave reflector.

A working principle of scanning and projection of a retina in the system architecture is: The RGB light source 10 is controlled by a controller to quickly obtain, through modulation, pixels of required specifications (for example, colors and brightness of the pixels) within each modulation cycle; after being scanned by the beam scanner 12 along a known scanning path, modulated light for the pixels obtained through modulation are projected onto the entrance pupil optical apparatus 13 in a time-division manner to form a virtual image; and after being reflected and converged by the entrance pupil optical apparatus 13, the modulated light on the virtual display image directly passes through a pupil of the eyeball 15, and is imaged and displayed on a retina of the eyeball 15.

The eyeball tracking technology mentioned in the Background is mainly used to study people's psychological activities by observing people's eyeball movements, and probes into a relationship between eyeball movements and people's psychological activities by analyzing recorded eyeball movement data. In recent years, with the advent of an AR/VR technology and the catalysis of popular applications such as foveated rendering (FR) and new man-machine interaction, an eyeball tracking technology is playing an increasingly important role, and is very likely to become a necessary function of future intelligent consumer electronic products.

As described above, at present, there are two types of common eyeball tracking technologies in the industry: a PCCR-based technology and an ICCR-based technology. A PCCR-based system usually includes an illumination light source and a camera apparatus, and the illumination light source usually uses an infrared or near-infrared light-emitting diode (LED) or LED group as a light source to illuminate a human eye, so as to project a fixed graph (which is usually a simple graph such as a circle or a trapezoid, or may be a relatively complex pattern) onto the human eye in real time. The camera apparatus photographs a pupil center of the human eye in real time; photographs an image obtained from the graph reflected by a cornea, to obtain a vector that connects the pupil center (PC) and a corneal reflection light-spot center (CR); and calculate a human eye gaze direction with reference to an algorithm. The ICCR-based system also includes an illumination light source and a camera apparatus, and the illumination light source usually uses a visible-light LED or LED group as a light source to illuminate a human eye, so as to project a fixed graph onto the human eye. Because of a relatively weak contrast between a pupil and an iris under visible light, the ICCR captures an iris center IC instead of a pupil center PC; obtains, based on a human eye image photographed by the camera apparatus in real time, a vector that connects the IC and a corneal reflection light-spot center CR; and further calculates a human eye gaze direction through calculation with reference to an algorithm. A relatively low sampling frequency of the camera apparatus results in a very low working frequency of the PCCR-based system or the ICCR-based system. If an existing PCCR-based or ICCR-based system is used to perform eyeball tracking on a human eye without considering costs, problems of low photographing and sampling frequencies, low eyeball tracking accuracy, and a high latency still exist.

To resolve these problems, this application proposes an eyeball tracking system. On a basis of scarcely changing an original architecture of a scan-type retinal projection system, an illumination light source that illuminates the eyeball 15 of the human eye is integrated into the RGB light source 10, to obtain, by reusing an optical path along which a display light ray is imaged on the retina of the eyeball 15 after being projected by the beam scanner 12 and the entrance pupil optical apparatus 13, an illumination optical path along which an illumination light ray illuminates the eyeball 15; and a photoelectric detector 14 is used to collect a receive optical power of the illumination light ray reflected by the eyeball 15 when the eyeball 15 is illuminated, so as to implement an efficient eyeball tracking function based on an eyeball tracking algorithm corresponding to the receive optical power. Major product forms of the eyeball tracking system provided in this application are wearable display products such as AR glasses and a virtual reality head-mounted display (VR HMD).

Figure 3:
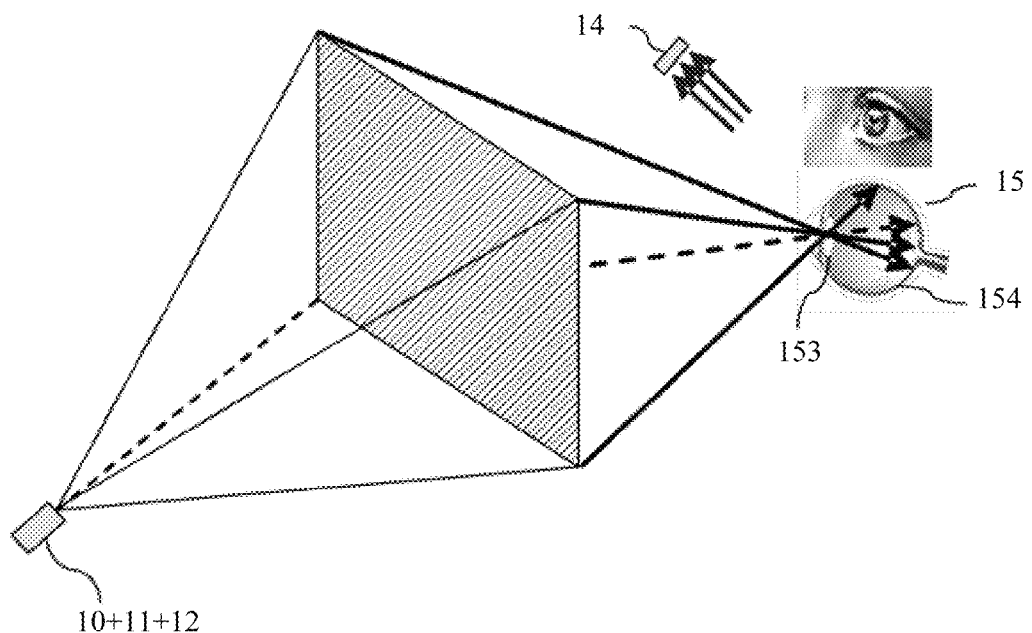
FIG. 3 is a schematic structural diagram 2 of an eyeball tracking system according to this application.

It is assumed that the illumination light source is an IR light source that transmits infrared (IR) light. As shown in FIG. 3, from a perspective of hardware, the eyeball tracking system includes at least: an IR light source 11, an RGB light source 10, a beam scanner 12, an entrance pupil optical apparatus 13, and a photoelectric detector 14. The IR light source 11, the beam scanner 12, and the entrance pupil optical apparatus 13 constitute an illumination system that illuminates a human eye. The RGB light source 10, the beam scanner 12, and the entrance pupil optical apparatus 13 constitute a retinal projection system that performs imaging on a retina of a human eye. Compared with the scan-type retinal projection system shown in FIG. 1, the eyeball tracking system makes the following improvements:

1. Improvement to the light source: One or more IR light sources 11 are added to the original RGB light source 10.

The IR light source 11 may be controlled by a controller to: transmit IR to the beam scanner 12 at a modulation time point of each pixel within any modulation cycle of the RGB light source 10, or transmit IR continuously within each modulation cycle of the RGB light source 10.

2. Beam scanner 12: scans the IR transmitted by the IR light source 11 synchronously while scanning a display light ray transmitted by the RGB light source 10, so that the RGB display light ray projected onto the entrance pupil optical apparatus 13 constitutes a colored virtual image, and the IR projected onto the entrance pupil optical apparatus 13 constitutes a virtual IR image that has a same size as the colored virtual image, as shown in FIG. 3.

3. Improvement to the entrance pupil optical apparatus 13: The entrance pupil optical apparatus 13 not only has an RGB reflection function, but also has an IR reflection function. In other words, the entrance pupil optical apparatus 13 not only can reflect an RGB display light ray with a wavelength in a visible light band, but also can reflect IR with a wavelength in an infrared band. In a specific implementation, a functional film is disposed on the entrance pupil optical apparatus 13, and both the RGB display light ray and the IR that are projected onto the entrance pupil optical apparatus 13 can penetrate through the functional film. However, the functional film performs different levels of reflection on the RGB display light ray and the IR, so that the RGB display light ray penetrating through the entrance pupil optical apparatus 13 passes through a pupil after being reflected and is imaged on a retina, and the IR penetrating through the entrance pupil optical apparatus 13 covers most area of the eyeball after being reflected. In this way, the eyeball 15 of the human eye is illuminated. In other words, the functional film performs different levels of reflection on the RGB display light ray and the IR, to ensure that the IR illuminates a human eye in a specific range instead of passing through the pupil to reach the retina like the RGB display light ray.

Figure 2:
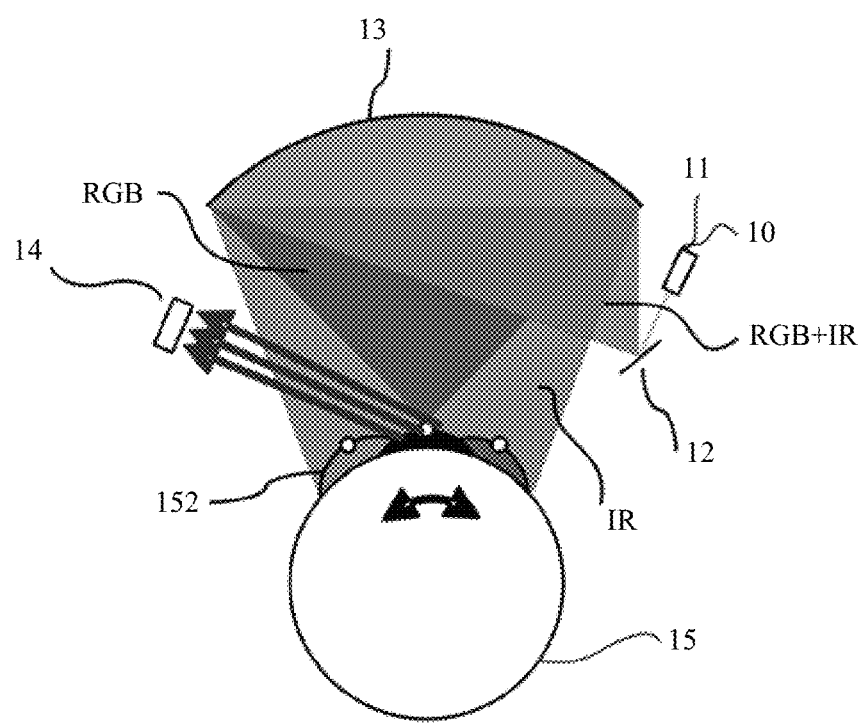
FIG. 2 is a schematic structural diagram 1 of an eyeball tracking system according to this application.

It should be noted that different levels of reflection by the entrance pupil optical apparatus 13 is specifically presented in that a convergence focal length of the IR reflected by the entrance pupil optical apparatus 13 is greater than a convergence focal length of the reflected RGB display light ray. As shown in FIG. 2, a focus obtained by converging the reflected IR is behind the eyeball 15, and a focus obtained by converging the reflected RGB display light ray is at the pupil of the eyeball 15. Therefore, the convergence focal length of the reflected IR is greater than the convergence focal length of the reflected RGB display light ray.

4. Addition of one photoelectric detector 14: When the IR reflected by the entrance pupil optical apparatus 13 illuminates a human eye, because a surface protrusion part of a cornea 151 of an eyeball 15 of the human eye is equivalent to a sphere-like reflection surface, the IR illuminating the human eye is reflected at different angles after illuminating the surface of the cornea. The photoelectric detector 14 is disposed on a reflection optical path of IR reflected by the eyeball 15 when the eyeball 15 of the human eye is illuminated, and is configured to receive IR reflected by the eyeball 15 at different angles and collect optical powers of the received IR, also referred to as receive optical powers. A receive optical power of IR reflected by the eyeball 15 is collected each time when the IR reflected by the eyeball 15 is received.

It should be noted that the photoelectric detector 14 is set to periodically collect receive optical powers, where a cycle is referred to as a detection cycle, and duration of the detection cycle may be designed flexibly. For example, a detection cycle is uniquely corresponding to one modulation cycle, or a detection cycle is uniquely corresponding to a plurality of consecutive modulation cycles.

Figure 4:
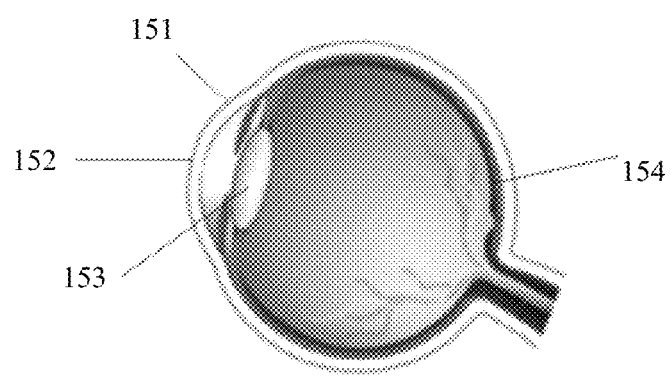
FIG. 4 is a schematic structural diagram of an eyeball according to this application.

5. Algorithm improvement: As shown in FIG. 4, a surface layer of an eyeball 15 of a human eye is covered by a cornea 151 and includes a sphere-like protrusion part 152. When a human eye gaze direction changes, the protrusion part rotates accordingly. As shown in FIG. 4, the eyeball 15 further includes a pupil 153 and a retina 154. According to a reflection law of a surface of the cornea 151 of the eyeball 15, when an eyeball 15 gaze direction remains unchanged, receive optical power values of IR reflected by the eyeball 15 at different angles are different. As the eyeball gaze direction changes, a reflection angle of the IR reflected by the eyeball 15 also changes with the eyeball gaze direction, and optical power values of IR reflected by the eyeball 15 at different angles also change with the eyeball gaze direction. Experiments show that there is a specified change rule between the eyeball gaze direction and receive optical powers collected by the photoelectric detector 14 within one or more detection cycles. If the detection cycle is fixed, there is a one-to-one matching relationship between eyeball gaze directions and receive optical powers within the fixed detection cycle. Based on this, this application proposes an eyeball tracking algorithm corresponding to the IR receive optical power values.

The eyeball tracking algorithm corresponding to the IR receive optical power value includes a real-time running part and an offline training part. When a detection cycle is a specified fixed value, a plurality of fixed collection time points are set within each detection cycle, and receive optical power values of most of IR reflected by the eyeball 15 at different angles can be collected at the plurality of fixed collection time points. Based on the foregoing configuration condition, a one-to-one matching relationship between a plurality of eyeball gaze directions and a plurality of receive optical power values within one or more detection cycles can be obtained through offline training. Based on the foregoing configuration condition, a plurality of receive optical power values collected within any detection cycle can be calculated through real-time running. A current gaze direction of the eyeball 15 can be tracked based on the data obtained through real-time running and offline training. To be specific, an eyeball 15 line-of-sight direction that matches the plurality of receive optical power values for one or more detection cycles that are obtained through real-time running is determined as the current gaze direction of the eyeball 15 based on the receive optical power value for one or more detection cycles that is obtained through real-time running and the one-to-one matching relationship between the plurality of eyeball gaze directions and the plurality of receive optical power values that is obtained within one or more detection cycles through offline training.

In this application, the photoelectric detector 14 collects the receive optical power values of the IR reflected by the eyeball 15 at different angles, and therefore the photoelectric detector 14 is an optical power collection apparatus. In the prior art, a camera photographs a human eye, and the camera is an image collection apparatus. An optical power collection frequency of the photoelectric detector 14 is far higher than an image collection frequency of the camera in the prior art. In this application, based on the illumination system including the IR light source 11, the beam scanner 12, and the entrance pupil optical apparatus 13, the photoelectric detector 14 is used to collect an optical power of an eyeball 15 reflection light ray to perform eyeball tracking. Therefore, compared with the prior art, this application helps implement a low latency because of a higher collection frequency.

Further, because the collection frequency of the photoelectric detector 14 is high, precision of eyeball tracking performed based on the collected receive optical power value is increased, compared with the prior art.

Still further, because the photoelectric detector 14 is a device of a micron size or even a micro-nano size, the eyeball tracking system provided in this application further has advantages of a small size, low power consumption, and low costs.

To implement control, the eyeball tracking system further includes a controller. The controller loads an eyeball tracking algorithm corresponding to a receive optical power value, can run the algorithm in real time, and also stores offline training data that can be invoked at any time. The controller may further send instruction signals to the RGB light source 10, the beam scanner 12, and the photoelectric detector 14 based on an algorithm requirement, to instruct the RGB light source 10, the beam scanner 12, and the photoelectric detector 14 to run normally under respective configurations.

It should be noted that the RGB light source 10 obtains a plurality of pixels through modulation from any frame of image within any modulation cycle according to an instruction signal of the controller. The RGB light source 10 outputs a beam of modulated light to the beam scanner 12 each time the RGB light source 10 obtains a pixel through modulation. The modulated light is RGB mixed light corresponding to the pixel obtained through modulation. The modulation cycle of the RGB light source 10 and a modulation time point corresponding to each pixel within each modulation cycle are preconfigured, one modulation cycle is duration required for sequentially modulating all pixels in one frame of two-dimensional image, and any pixel is corresponding to one modulation time point. If one frame of image includes 800×600 pixels, that is, the pixels in the frame of image constitute a matrix with 800 rows and 600 columns, 600 pixels in each row are corresponding to 600 modulation time points. The RGB light source 10 modulates the pixels row by row based on the preconfigured modulation cycle and modulation time points according to an instruction signal of the controller, until all of the 800×600 pixels in the frame of image are modulated. In different modulation cycles, a quantity of modulated pixels is the same as configurations of modulation time points corresponding to the pixels. For example, within any two modulation cycles, 800×600 pixels are obtained through modulation in each modulation cycle, each pixel is corresponding to one modulation cycle, and a time interval between a modulation time point of any of 600 pixels in each row and a modulation time point of the $1^{st}$ pixel in the row in one modulation cycle is the same as that in the other modulation cycle.

Figure 11:
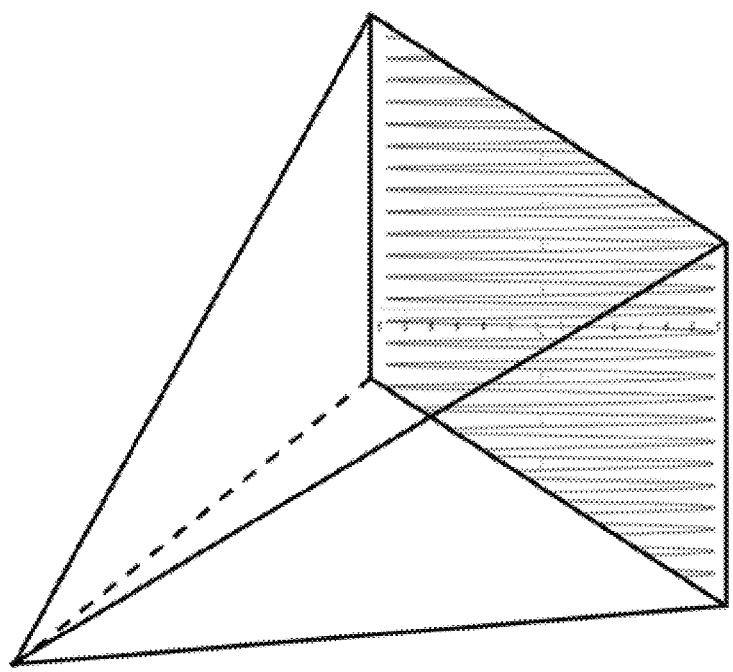
FIG. 11 is a schematic diagram 1 of a scanning path of a beam scanner according to this application.
Figure 12:
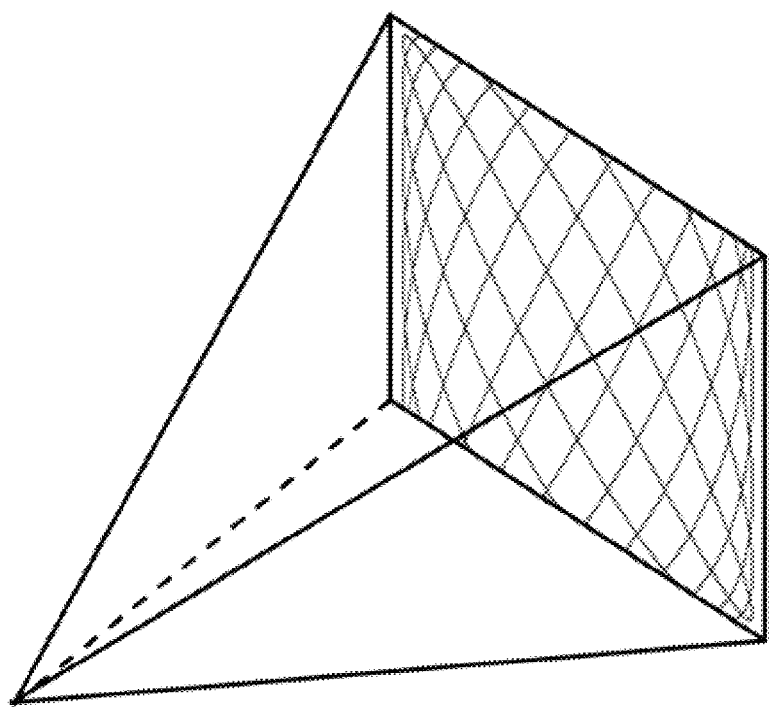
FIG. 12 is a schematic diagram 2 of a scanning path of a beam scanner according to this application.
Figure 13:
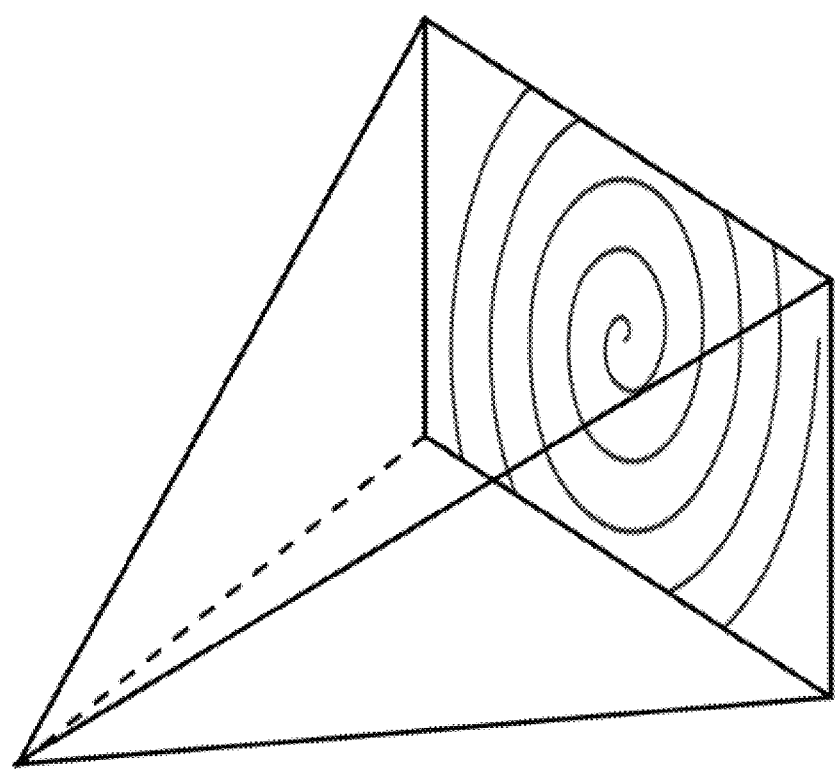
FIG. 13 is a schematic diagram 3 of a scanning path of a beam scanner according to this application.

It should be noted that the beam scanner 12 sequentially scans, along a preconfigured scanning path within any modulation cycle of the RGB light source 10 according to an instruction signal of the controller, modulated light corresponding to the plurality of pixels in the corresponding frame of image, and projects, onto the entrance pupil optical apparatus 13, the scanned modulated light corresponding to the plurality of pixels. A location at which modulated light corresponding to each pixel is projected onto the entrance pupil optical apparatus 13 after being scanned by the beam scanner 12 is unique. For example, the RGB light source 10 sequentially obtains 800×600 pixels through modulation within a modulation cycle of a frame of image, and modulated light corresponding to the 800×600 pixels is projected onto the entrance pupil optical apparatus 13 after being scanned by the beam scanner 12, to form a colored virtual image. The 800×600 pixels obtained by the RGB light source 10 through modulation have a one-to-one correspondence with the 800×600 pixels in the colored virtual image. Duration required by the beam scanner 12 to scan, along a fixed scanning path, modulated light corresponding to all pixels in any frame of image is one scanning cycle. In other words, one modulation cycle is corresponding to one scanning cycle. However, there is no one-to-one correspondence between modulation time points and scanning time points of all pixels, and a scanning time point of each scanning point is related to a scanning path. The scanning path of the beam scanner 12 is a track route for scanning a pixel. The scanning path is preconfigured, and may be a scanning path corresponding to row-by-row scanning shown in FIG. 11, may be a scanning path corresponding to grid scanning shown in FIG. 12, or may be a scanning path corresponding to spiral scanning shown in FIG. 13.

It should be noted that the IR light source 11 may alternatively transmit IR to the beam scanner 12 within any modulation cycle of the RGB light source 10 according to an instruction signal of the controller. In a manner, the IR light source 11 transmits IR continuously within any modulation cycle of the RGB light source 10. In another manner, the IR light source 11 transmits IR to the beam scanner 12 discontinuously within any modulation cycle of the RGB light source 10. Within any modulation cycle, the IR light source 11 transmits IR once synchronously each time the RGB light source 10 obtains one pixel through modulation. Because the transmitted IR is used to illuminate a human eye, each time point at which the IR light source 11 transmits IR is referred to as an illumination time point.

If the IR light source 11 transmits IR continuously, the beam scanner 12 continuously projects the IR onto the entrance pupil optical apparatus 13 along a preconfigured scanning path. If the IR light source 11 and the RGB light source 10 transmit IR to the beam scanner 12 synchronously, each time the beam scanner 12 scans, according to a preconfigured scanning path, modulated light corresponding to one pixel, the beam scanner 12 scans one beam of IR synchronously and projects the scanned RGB display light ray and IR onto the entrance pupil optical apparatus 13. In this case, the colored virtual image formed on the entrance pupil optical apparatus 13 has a same size as the virtual IR image.

It should be noted that the photoelectric detector 14 collects a plurality of receive optical power values within any detection cycle according to an instruction signal of the controller. The detection cycle is not set randomly, but is related to a modulation cycle. Reasons are as follows:

Because the IR reflected by the eyeball 15 when the IR reflected by the entrance pupil optical apparatus 13 illuminates the eyeball 15 is reflected at different angles, and a location of the photoelectric detector 14 is fixed, to collect receive optical power values of the IR reflected at different angles, a unique collection time point needs to be configured for the receive optical power values of the IR reflected at different angles. A reflection angle of the IR reflected from a surface of the eyeball 15 is related to a location at which the IR illuminates the eyeball 15. From a reverse optical path of the IR that illuminates the eyeball 15, it can be learned that the location at which the IR illuminates the eyeball 15 is corresponding to a location at which the IR is projected onto the entrance pupil optical apparatus 13, the location at which the IR is projected onto the entrance pupil optical apparatus 13 is corresponding to a location on a scanning path along which the IR is scanned by the beam scanner 12, the location on the scanning path along which the IR is scanned by the beam scanner 12 is corresponding to an illumination time point of the IR, and the illumination time point of the IR is corresponding to a modulation time point of one pixel. Therefore, it can be learned that if a collection time point is determined based on a preconfigured modulation cycle of one frame of two-dimensional image and a modulation time point corresponding to the modulation cycle, the receive optical power values of the IR reflected from the surface of the eyeball 15 at different angles can be collected.

Specifically, a detection cycle and a modulation cycle have the following specific relationships.

Optionally, duration of a detection cycle is equal to duration of the modulation cycle. For example, for an image with a resolution of 800×600, duration of a modulation cycle of each frame of image is T, and within each modulation cycle T, 800×600 modulation time points are configured for 800×600 pixels. Duration of a detection cycle of the photoelectric detector 14 is also configured as T, and within one detection cycle T, 800×600 collection time points are configured. One modulation cycle of the RGB light source 10 is corresponding to one detection cycle of the photoelectric detector 14, and a modulation time point of the $1^{st}$ pixel within one modulation cycle of the RGB light source 10 is the same as a collection time point of the $1^{st}$ receive optical power value within a corresponding detection cycle of the photoelectric detector 14.

Optionally, duration of a detection cycle is greater than duration of a modulation cycle. For example, still for an image with a resolution of 800×600, within each modulation cycle T, 800×600 modulation time points are configured for 800×600 pixels. Duration of a detection cycle of the photoelectric detector 14 is total duration of two consecutive modulation cycles T, that is, one detection cycle is 2T. Within each T, 800×600 collection time points are configured for the photoelectric detector 14, and a total of 1600×600 collection time points are configured within one detection cycle.

It should be noted that a specific configuration of collection time points of each detection cycle of the photoelectric detector 14 may be set flexibly based on required eyeball tracking precision. For example, it is assumed that duration of a detection cycle is equal to duration of a modulation cycle and an image has a resolution of 800×600. Duration of a modulation cycle in each frame of image is T, and within each modulation cycle T, 800×600 modulation time points are configured for 800×600 pixels. If relatively high eyeball tracking precision is required, correspondingly, the photoelectric detector 14 configures 800×600 collection time points, and one collection time point is uniquely corresponding to one modulation time point. If relatively high eyeball tracking precision is not required, correspondingly, the photoelectric detector 14 may configure 16×6 collection time points, to extract six modulation time points as collection time points from 600 modulation time points in a corresponding row at an interval of 50 rows in 800×600 modulation time points. In this case, in the modulation cycle of one frame of image, there are a total of 16×6 collection time points. If eyeball tracking precision can still be lower, correspondingly, the photoelectric detector 14 may configure 8×6 collection time points, to extract six modulation time points as collection time points from 600 modulation time points in a corresponding row at an interval of 100 rows in 800×600 modulation time points. In this case, in the modulation cycle of one frame of image, there are a total of 8×6 collection time points.

The following uses an image frame at a time point as an example to describe that an eyeball gaze direction and a receive optical power collected by the photoelectric detector 14 within one or more detection cycles present a specified change rule.

Figure 5:
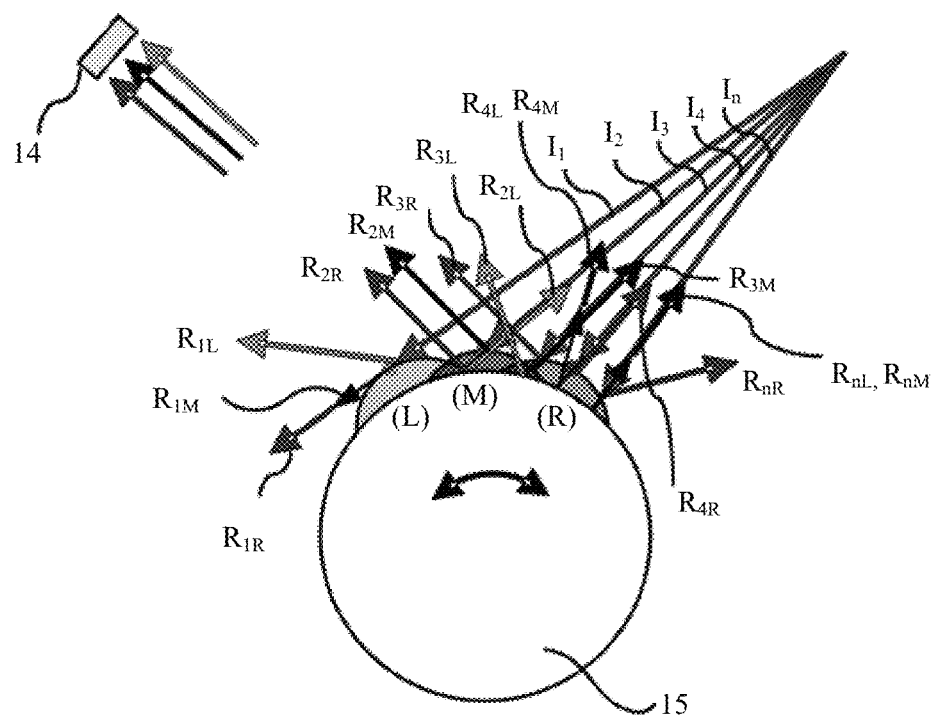
FIG. 5 is a schematic diagram 1 of a principle of an eyeball tracking algorithm according to this application.
Figure 7:
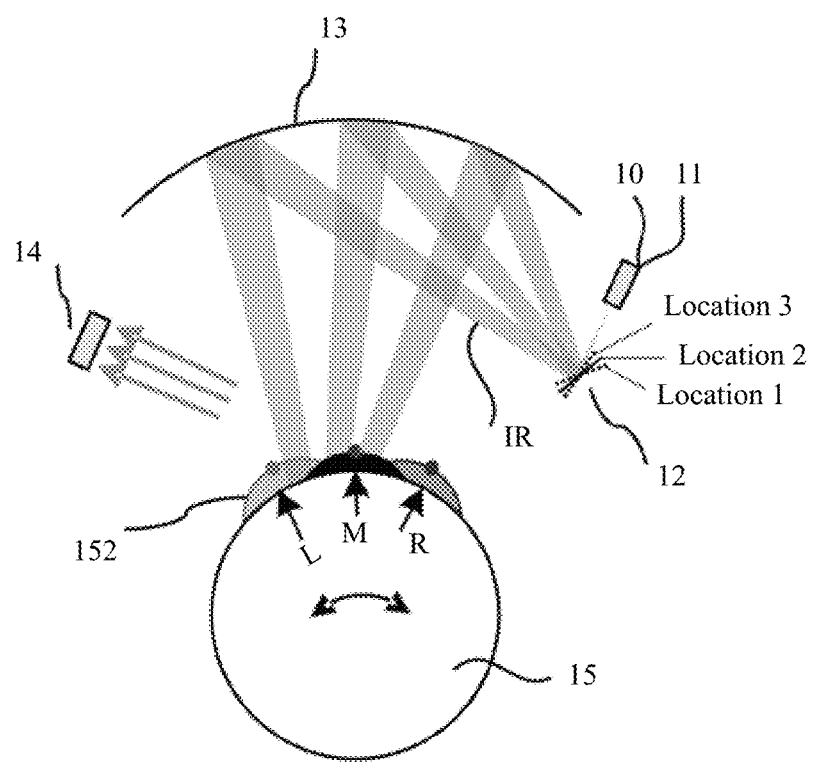
FIG. 7 is a schematic diagram 2 of a principle of an eyeball tracking algorithm according to this application.

For example, in FIG. 5, it is assumed that in a process of projecting modulated light for n pixels in a row of an image frame onto the eyeball 15 at n different angles, n collection time points $T_1$-$T_n$ are set, and n IR illumination light rays $I_1$-$I_n$ are projected onto the eyeball 15 at the time points $T_1$-$T_n$ at n different angles in two-dimensional space. Because a cornea of a human eye is protruding, when human eye gaze directions are different, a protrusion part is in different locations; when the human eye gazes in a direction, $I_1$-$I_n$ are reflected at the n different angles from the surface of the eyeball 15 at the time points $T_1$-$T_n$; and after $I_1$-$I_n$ are reflected at the n different angles, the photoelectric detector 14 may configure 16×6 collection time points. Receive optical power values of the IR that are collected at 600 modulation time points in corresponding rows at an interval of 50 rows in 800×600 modulation time points are different from each other. Using an IR illumination light ray $I_1$ as an example, when the protrusion part of the eyeball 15 is in three different locations: L (left), M (middle), and R (right) shown in the figure, IR receive optical power values of the collected $I_1$ reflected from three different angles are $R_{1L}$, $R_{1M}$, and $R_{1R}$. By analogy, when the protrusion part of the eyeball 15 is at the leftmost location L, IR receive optical power values, collected at n collection time points $T_1$-$T_n$, of $I_1$-$I_n$ reflected at n different angles are $R_{1L}$-$R_{nL}$. Similarly, when the protrusion part of the eyeball 15 is at the middle M location, IR receive optical power values, collected at the n collection time points $T_1$-$T_n$, of $I_1$-$I_n$ reflected at n different angles are $R_{1M}$-$R_{nM}$; and when the protrusion part of the eyeball 15 is at the rightmost location R, receive optical power values, collected at the n collection time points $T_1$-$T_n$, of $I_1$-$I_n$ reflected at n different angles are $R_{1R}$-$R_{nR}$. It can be seen from FIG. 7 that with the location change of the protrusion part of the eyeball 15, that is, with the change of the eyeball gaze direction, n different reflection angles at which $I_1$-$I_n$ are reflected by the eyeball 15 also change with the eyeball gaze directions. Because of different intensity of IR at one location received by the photoelectric detector 14 when the IR is reflected at n different angles, optical power values of the IR reflected by eyeball 15 at the n different angles also change with the eyeball gaze directions.

Because eyeball 15 gaze directions are distributed in a two-dimensional manner, a receive optical power value matrix corresponding to one gaze direction within one modulation cycle can be obtained based on n receive optical power values of $I_1$-$I_n$ that are collected when a light source performs projection in each row and that are reflected at n different angles. Similarly, when a modulation cycle is fixed, a one-to-one correspondence between a plurality of gaze directions and a plurality of receive optical power value matrices can be obtained. According to the foregoing principle, an algorithm may be built to perform offline training on a change rule between an eyeball gaze direction and a receive optical power collected by the photoelectric detector 14 within one or more detection cycles. The change rule between the eyeball gaze direction and the receive optical power collected by the photoelectric detector 14 within the one or more detection cycles is trained through offline training, so as to obtain a one-to-one matching relationship between a plurality of eyeball gaze directions and a plurality of receive optical power values within one or more detection cycles.

Based on the foregoing principle, a mathematical model may be used to build an eyeball tracking algorithm corresponding to a receive optical power value, to track and position an eyeball gaze direction or a pupil center of the eyeball 15 corresponding to an eyeball gaze direction.

Figure 6:
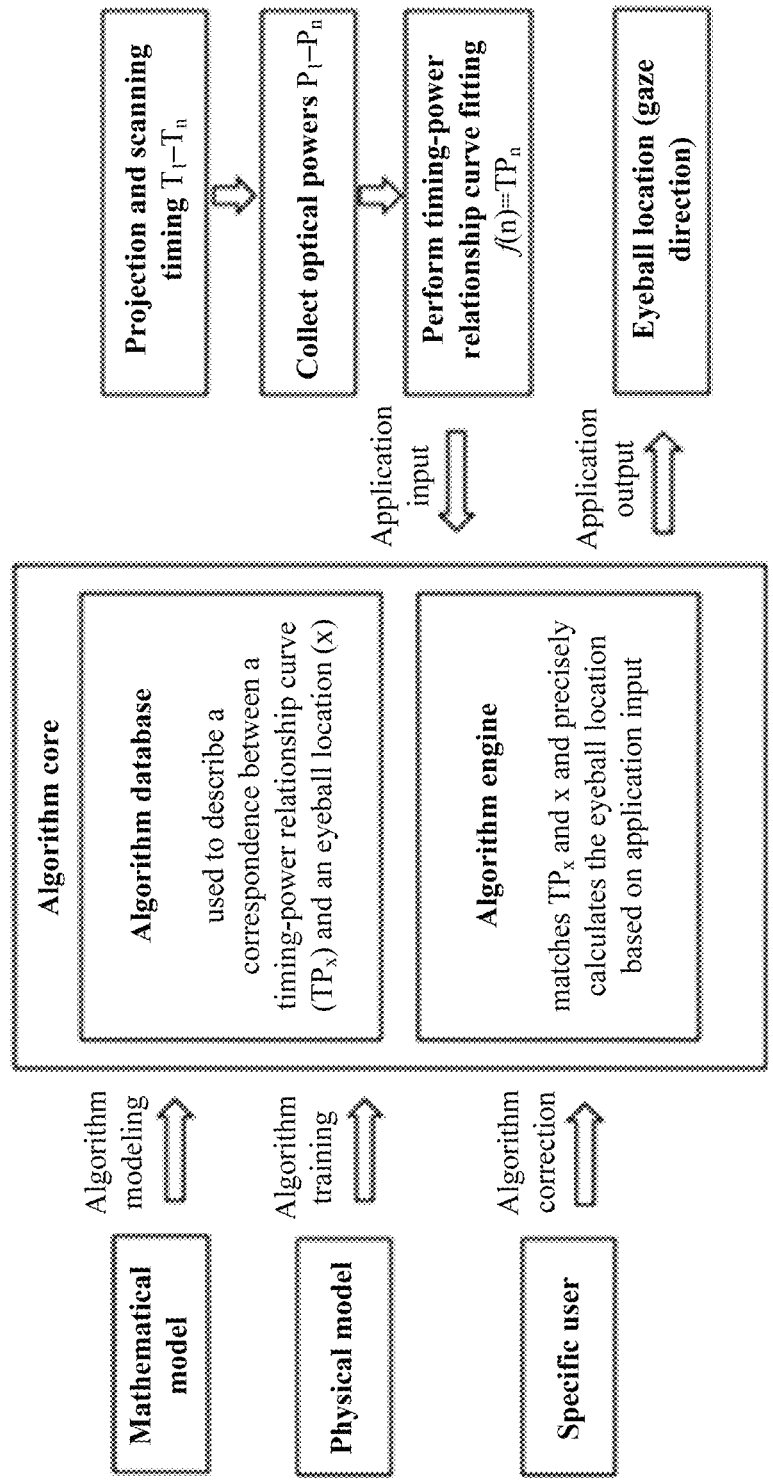
FIG. 6 is a schematic diagram of specific implementation of an eyeball tracking algorithm according to this application.

As shown in FIG. 6, a mathematical model may be first used to perform algorithm modeling, and then algorithm training is performed based on eyeball tracking precision and a resolution requirement by building an actual physical model, to build an algorithm database satisfying the eyeball tracking precision and the resolution requirement in an algorithm core.

As shown in Table 1, the algorithm database stores n collection time points $T_1$-$T_n$ within one or more detection cycles, n illumination light rays $I_1$-$I_n$ projected at n different angles, and an index relationship between several eyeball gaze directions and receive optical power values $P_1$-$P_n$ of $I_1$-$I_n$, collected at the collection time points $T_1$-$T_n$, reflected at n different angles.

TABLE 1

| | Projected | Optical Power Group | | |
|---|---|---|---|---|
| Timing | Illumination Light Ray | Gaze Direction 1 | Gaze Direction 2 | ... Gaze Direction x |
| $T_1$ | $I_1$ | $P_{11}$ | $P_{21}$ | $P_{x1}$ |
| $T_2$ | $I_2$ | $P_{12}$ | $P_{22}$ | $P_{x2}$ |
| $T_3$ | $I_3$ | $P_{13}$ | $P_{23}$ | $P_{x3}$ |
| ... | ... | ... | ... | ... |
| $T_n$ | $I_n$ | $P_{1n}$ | $P_{2n}$ | $P_{xn}$ |

Optionally, before use by a user, a correction program may be further used to perform algorithm correction and compensation. On such basis, the eyeball tracking algorithm can be implemented with reference to an algorithm engine that has been compiled in software.

During actual application, provided that optical power values $P_1$-$P_n$ within $T_1$-$T_n$ are collected and a curve of a relationship between the optical power values $P_1$-$P_n$ and timings $T_1$-$T_n$ are obtained through fitting, the curve can be used as application input to be input into the compiled algorithm engine. The algorithm engine performs calculation and compensation based on the algorithm database, to output an eyeball gaze direction or output a pupil 153 location of the eyeball 15 corresponding to an eyeball gaze direction.

Further, to simplify an algorithm, an auxiliary algorithm may be further added during algorithm modeling. The auxiliary algorithm calculates an optical power reference values for one or more detection cycles based on a plurality of receive optical power values collected within the one or more detection cycles. A one-to-one matching relationship between a plurality of eyeball gaze directions and a plurality of optical power reference values that is obtained within one or more detection cycles is trained by using the built algorithm. The optical power reference value for one or more detection cycles can be calculated through real-time running. The eyeball 15 line-of-sight direction that matches the optical power reference value for one or more detection cycles that is obtained through real-time running is determined as the current gaze direction of the eyeball 15 based on the optical power reference value for one or more detection cycles that is obtained through real-time running and the one-to-one matching relationship between the plurality of eyeball gaze directions and the plurality of optical power reference values that is obtained within one or more detection cycles through offline training.

Optionally, the optical power reference value is an optical power ratio, that is, a ratio of each receive optical power value to a transmit optical power value of IR transmitted by the IR light source 11 at a collection time point of the receive optical power value.

Optionally, the optical power reference value may alternatively be a largest value in all receive optical power values collected within one or more detection cycles.

Figure 8:
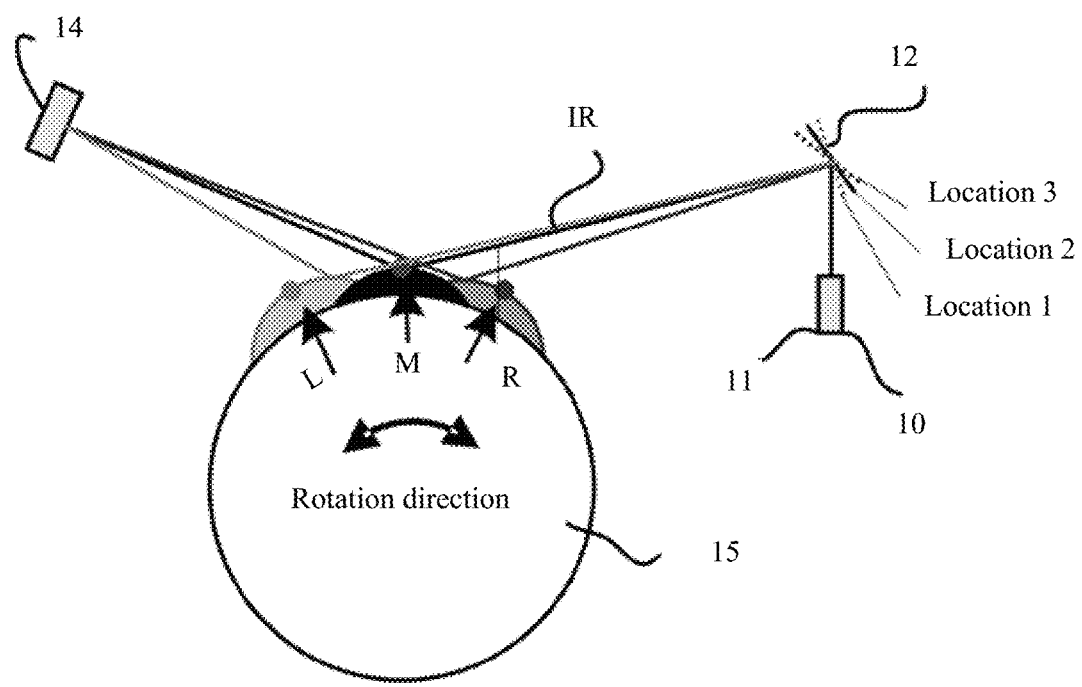
FIG. 8 is a schematic diagram 3 of a principle of an eyeball tracking algorithm according to this application.

This application provides an algorithm in which an optical power reference value is an optical power ratio. For an algorithm principle of the algorithm, refer to FIG. 7 (or FIG. 8, which is applicable to an eyeball tracking system in FIG. 24 that includes no entrance pupil optical apparatus). Because locations of the beam scanner 12 and the photoelectric detector 14 are relatively fixed, in a process in which IR is scanned by the beam scanner 12 along a fixed scanning path and projected for illumination, the photoelectric detector 14 may obtain, through fitting based on a series of optical power ratios collected within a fixed detection cycle, a fitting curve of the plurality of optical power ratios for the fixed detection cycle, and an association relationship between a plurality of eyeball gaze directions (such as an eyeball gaze direction L, an eyeball gaze direction M, and an eyeball gaze direction R in FIG. 7) and the fitting curve of the plurality of optical power ratios for the fixed detection cycles. The fitting curve of the plurality of optical power ratios for the fixed detection cycles is a curve of a relationship between the plurality of optical power ratios for the fixed detection cycle and corresponding collection time points.

In addition, when the location of the photoelectric detector 14 remains unchanged while the beam scanner 12 is at different locations, association relationships between a plurality of eyeball gaze directions and a fitting curve of a plurality of optical power ratios for the fixed detection cycle may be obtained through fitting, to adapt to different application scenarios. When the photoelectric detector 14 is at a location 1, a location 2, and a location 3 in FIG. 7 or FIG. 8, correspondingly, there is an association relationship between a plurality of eyeball gaze directions and a fitting curve of a plurality of optical power ratios for the fixed detection cycle.

TABLE 2

| Scanning Frequency | T1 | T2 | T3 | T4 | T5 | T6 | T7 | T8 |
|---|---|---|---|---|---|---|---|---|
| Row 1 | 0.24 | 0.24 | 0.23 | 0.22 | 0.22 | 0.24 | 0.24 | 0.24 |
| Row 5 | 0.24 | 0.24 | 0.23 | 0.22 | 0.22 | 0.24 | 0.24 | 0.24 |
| Row 10 | 0.24 | 0.24 | 0.23 | 0.22 | 0.22 | 0.24 | 0.24 | 0.24 |
| Row 15 | 0.25 | 0.25 | 0.24 | 0.24 | 0.24 | 0.25 | 0.25 | 0.25 |
| ... | ... | ... | ... | ... | ... | ... | ... | ... |
| Row 600 | 0.22 | 0.22 | 0.22 | 0.21 | 0.21 | 0.22 | 0.22 | 0.22 |

It is assumed that a retinal projection system performs projection at a specified frame rate. In a retinal projection and imaging process of one frame of image, n collection time points $T_1$-$T_n$ and a series of optical power ratios $B_1$-$B_n$ corresponding to receive optical powers $P_1$-$P_n$ collected by the photoelectric detector 14 at the n collection time points $T_1$-$T_n$ are configured. For example, for an image with a resolution of 800×600, as shown in Table 2, 600 modulation time points in each row of pixels are corresponding to eight collection time points, that is, T1-T8, and a correspondence between optical power ratios within the frame of image and collection time points is a matrix including 8×600 optical power ratios. Optionally, if a modulation time point of each pixel is corresponding to one collection time point, a correspondence between optical power ratios within the frame of image and collection time points is a matrix including 800×600 optical power ratios. At this time, eyeball tracking precision is the highest. If a collection time point T is a horizontal axis and an optical power ratio B is a vertical axis, a curve of a relationship between an optical power ratio and a collection time point, for example, $f(n)=TB_n$, may be obtained through fitting. Then, calculation and simulation are performed by using a mathematical model, to generate an algorithm of an association relationship between an eyeball gaze direction x and a curve f(n); then the basic algorithm is upgraded through universal physical model training to a more precise upgraded algorithm of the association between the eyeball gaze direction x and the curve f(n); and finally a mechanism for implementing software correction for a specific user before product use is used to further optimize matching precision of the association relationship between the eyeball gaze direction x and the curve f(n), so as to obtain a final application algorithm.

Optionally, the fitting curve of the eyeball gaze direction and the plurality of optical power ratios for the fixed detection cycle may alternatively be divided into a plurality of sub-curves. That is, the complete curve f(n) that represents the eyeball gaze direction x is divided into several equal sub-curves, implementing higher-speed eyeball tracking. For example, three detection sub-cycles are configured within one detection cycle, and each detection sub-cycle is corresponding to several modulation time points in one frame of image, and a fitting curve of a plurality of optical power ratios within the three detection sub-cycles and collection time points constitute three curve sections. The eyeball 15 gaze direction is calculated based on the three curve sections.

An image with a resolution of 800×600 is still used as an example for further description. Each row of pixels are corresponding to eight collection time points. If one detection sub-cycle is corresponding to eight modulation time points in one row of pixels, an obtained optical power ratio matrix is a 1×8 matrix; or if one detection sub-cycle is corresponding to eight modulation time points in several rows (for example, rows 1, 60, 120, 180, 240, 300, 360, 420, 480, and 600) of pixels, an obtained optical power ratio matrix is a 10×8 matrix.

This application provides an algorithm in which an optical power reference value is a largest optical power value. For an algorithm principle of the algorithm, refer to FIG. 7 or FIG. 8. Because locations of the beam scanner 12 and the photoelectric detector 14 are relatively fixed, in a process in which IR is scanned by the beam scanner 12 along a fixed scanning path and projected for illumination, the photoelectric detector 14 may obtain, through fitting based on a largest value in a series of receive optical power values collected within a fixed detection cycle, a largest optical power for the fixed detection cycle, and an association relationship between a plurality of eyeball gaze directions (such as an eyeball gaze direction L, an eyeball gaze direction M, and an eyeball gaze direction R in FIG. 7 or FIG. 8) and a largest optical power value for the fixed detection cycles.

In addition, when the location of the photoelectric detector 14 remains unchanged while the beam scanner 12 is at different locations, association relationships between a plurality of eyeball gaze directions and a largest optical power value for the fixed detection cycle may be obtained through fitting, to adapt to different application scenarios. When the photoelectric detector 14 is at a location 1, a location 2, and a location 3 in FIG. 23, correspondingly, there is an association relationship between a plurality of eyeball gaze directions and a fitting curve of a largest optical power value for the fixed detection cycle.

It is assumed that a retinal projection system performs projection at a specified frame rate. In a retinal projection and imaging process of one frame of image, n collection time points $T_1$-$T_n$ and a largest optical power value corresponding to receive optical powers $P_1$-$P_n$ collected by the photoelectric detector 14 at the n collection time points $T_1$-$T_n$ are configured, and the largest receive optical power value and a collection time point corresponding to the largest receive optical power value are stored. Calculation and simulation are performed by using a mathematical model, to generate an algorithm of an association relationship between an eyeball gaze direction x, a largest receive optical power value, and a collection time point corresponding to the largest receive optical power value; then the basic algorithm is upgraded through universal physical model training to a more precise upgraded algorithm of the association relationship between the eyeball gaze direction x, the largest receive optical power value, and the collection time point corresponding to the largest receive optical power value; and finally a mechanism for implementing software correction for a specific user before product use is used to further optimize matching precision of the association relationship between the eyeball gaze direction x, the largest receive optical power value, and the collection time point corresponding to the largest receive optical power value, so as to obtain a final application algorithm.

In a possible design, the foregoing three algorithms may be defined by using a theoretical human eye data model, or may be obtained through software training and learning by using a general human eye model.

For example, the eyeball tracking algorithm may be designed in the following manner: In a laboratory, a real model with a 1:1 ratio to the eyeball 151 of a human body may be used to build a physical model, and an algorithm model is built, to set up a real product use environment. Then a correspondence between a series of optical power reference values and eyeball gaze directions is recorded under different image resolutions through massive model training and tests. The data constitutes an algorithm database stored in a host and a cloud server.

In a possible design, the foregoing three algorithms may be corrected with reference to an eye of a specific user before product use.

For example, when a user actually uses the device, a user calibration program may be used to perform algorithm correction. For example, a head-mounted display apparatus displays one light spot on each of an upper left corner, an upper right corner, a lower left corner, and a lower right corner of a screen; then a user sequentially looks at the light spots; the apparatus records an actually measured location of an eye; and through a user interaction operation, an algorithm module fine-tunes parameters to select an eyeball 15 tracking algorithm with proper precision, parameters, and proper recognition precision. Modulation of the RGB light source 10, scanning of the beam scanner 12, and collection of the photoelectric detector 14 are controlled based on the eyeball 15 tracking algorithm with proper precision, the parameters, and the proper recognition precision.

Compared with the prior art, in the eyeball tracking system provided in this application, a collection frequency of the photoelectric detector 14 is increased remarkably, and the collection frequency of the photoelectric detector 14 can be synchronized or partially synchronized with a transmission frequency of an infrared light source. A relatively high collection frequency helps position an eyeball 15 location and an eyeball 15 gaze direction more precisely.

Figure 9:
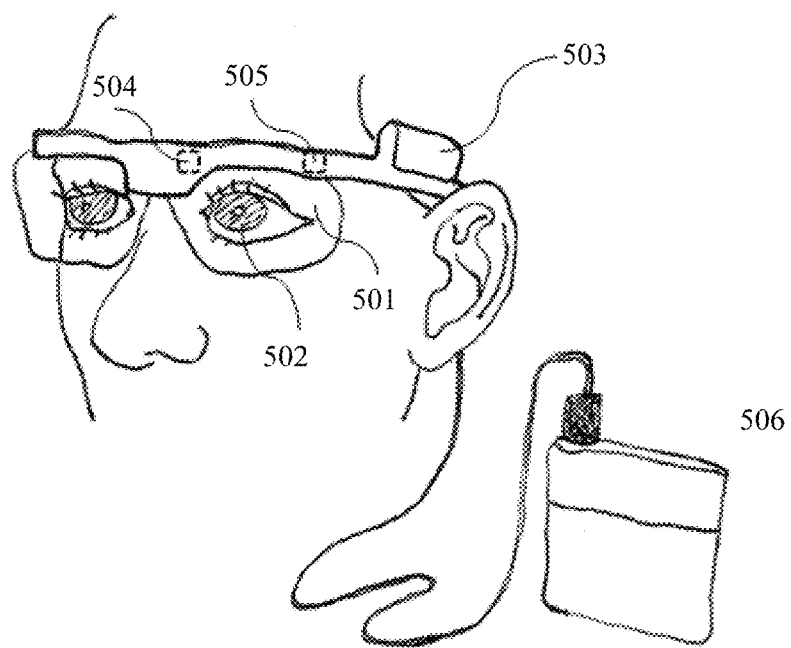
FIG. 9 is a schematic structural diagram 1 of VR/AR glasses that are a product form of an eyeball tracking system according to this application.
Figure 10:
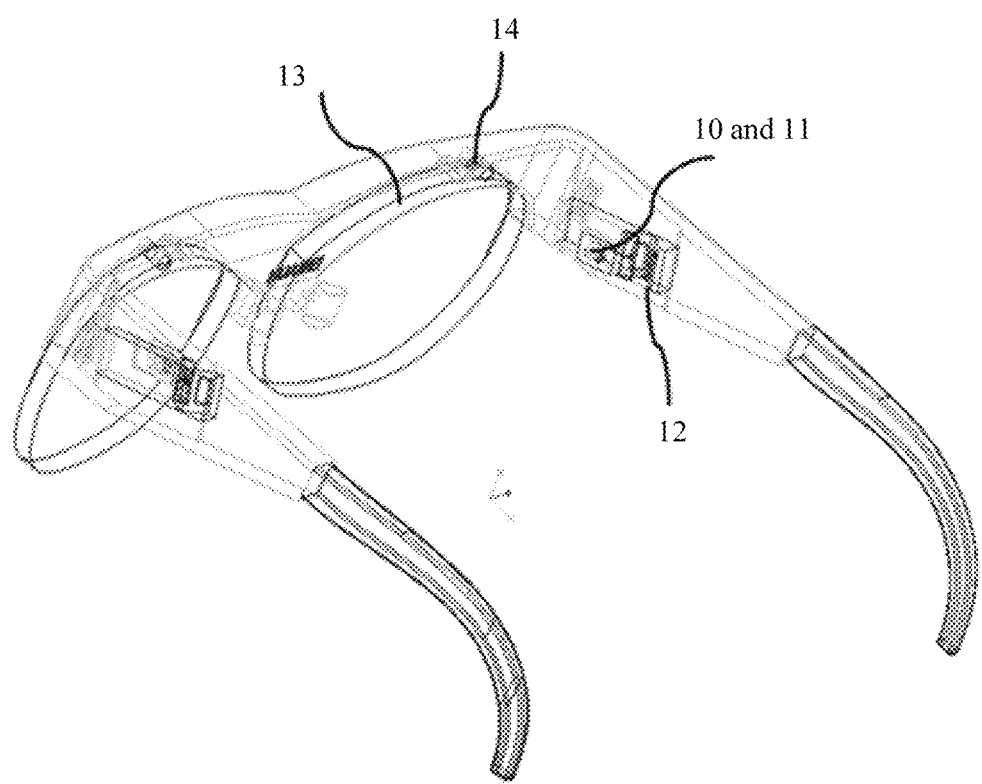
FIG. 10 is a schematic structural diagram 2 of VR/AR glasses that are a product form of an eyeball tracking system according to this application.

Based on the same inventive concept, this application provides AR/VR glasses that have both a retinal projection function and a high-precision eyeball tracking function. As shown in FIG. 9 and FIG. 10, the AR/VR glasses include two eyeball tracking systems. The two eyeball tracking systems are disposed surrounding two optical lenses, respectively. Core parts of an eyeball tracking system corresponding to one optical lens 501 include an RGB light source 10, an IR light source 11, a beam scanner 12, an entrance pupil optical apparatus 13, a photoelectric detector 14, a controller, and a host. All of the RGB light source 10, the IR light source 11, the beam scanner 12, and the photoelectric detector 14 are electrically connected to the controller. The controller can send coordinated-operation instruction signals to the RGB light source 10, the IR light source 11, the beam scanner 12, and the photoelectric detector 14. The controller is mounted at a location 503 of a glasses frame, and the host 506 is disposed outside the AR/VR glasses, and may be connected to the controller by using a connection wire. The RGB light source 10 and the IR light source 11 are an integrated device. Optionally, the RGB light source 10 and the IR light source 11 may be alternatively integrated with the beam scanner 12 to constitute an integrated device mounted at a location near a lens, for example, a location 505 on the glasses frame. The entrance pupil optical apparatus 13 is two optical lenses 501. One or more IRPDs are integrated onto the photoelectric detector 14. The photoelectric detector 14 needs to be mounted at a location favorable for collecting IR reflected by the eyeball 15. For example, the photoelectric detector 14 is mounted at an upper edge location 504 of the frame that fastens a lens. Optionally, the controller and the host 506 may be integrated together. After being integrated, the controller and the host are disposed at a location in the glasses frame that fastens the lens.

The RGB light source 10 obtains an RGB display light ray through modulation within a corresponding modulation cycle as instructed by the controller, and projects the RGB display light ray obtained through modulation onto the beam scanner 12, and the IR light source 11 transmits IR to the beam scanner 12 within a corresponding modulation cycle as instructed by the controller.

A solution of integrating the RGB light source 10 and the IR light source 11 is any one of the following manners:

Manner 1: A device integrating the RGB light source 10 and the IR light source 11 is an integrally packaged multi-resonant-cavity pump laser capable of transmitting red (R), green (G), and blue (B) laser light and IR laser light. The pump laser converts laser light with several required wavelengths by using a nonlinear crystal.

Manner 2: A device integrating the RGB light source 10 and the IR light source 11 is an integrally packaged device of four semiconductor laser chips, where one semiconductor laser chip can transmit IR, and the other three semiconductor laser chips transmit red, green, and blue laser light, respectively.

Manner 3: A device integrating the RGB light source 10 and the IR light source 11 is an integrally packaged device of an LED group including four LEDs, where one LED can transmit IR, and the other three LEDs transmit red, green, and blue laser light, respectively.

Except for the foregoing three manners, the device integrating the RGB light source 10 and the IR light source 11 may use any other type of packaged light source capable of combining, shaping, and modulating beams, and can reflect IR and an RGB display light ray.

A four-beam combination solution of the device integrating the RGB light source 10 and the IR light source 11 may be implemented through free space beam combination, optical waveguide beam combination, optical fiber beam combination, or the like.

A package manner of the device integrating the RGB light source 10 and the IR light source 11 may be any one of TO-CAN package, free space package, and silicon photonics integration package.

Figure 14:
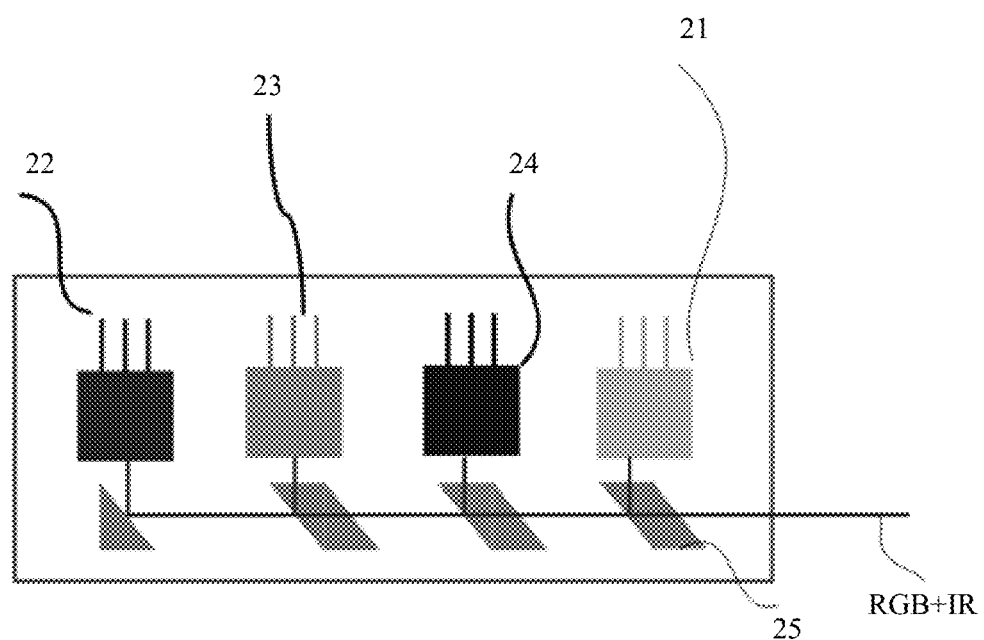
FIG. 14 is a schematic diagram 1 of a hardware integration solution of an RGB light source and an IR light source according to this application.

For the TO-CAN package manner of the device integrating the RGB light source 10 and the IR light source 11, refer to FIG. 14. A red laser chip 22, a green laser chip 23, a blue laser chip 24, and an IR laser chip are TO-CAN packaged to obtain the device integrating the RGB light source 10 and the IR light source 11. A beam combiner 25 is further integrated onto the integrated device, so that an IR laser light beam transmitted by the IR laser chip 21, a red laser light beam transmitted by the red laser chip 22, a green laser light beam transmitted by the green laser chip 23, and a blue laser light beam transmitted by the blue laser chip 24 are output from the integrated device together after being combined by the beam combiner 25. The output laser light beam includes an RGB display light ray generated by combining three laser light beams R, G, and B, and further includes IR.

Figure 15:
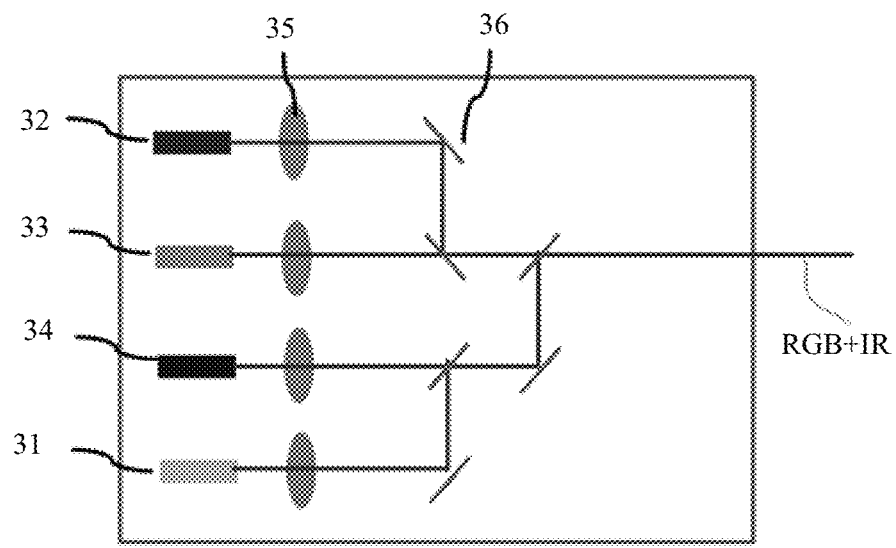
FIG. 15 is a schematic diagram 2 of a hardware integration solution of an RGB light source and an IR light source according to this application.

For the free space package manner of the device integrating the RGB light source 10 and the IR light source 11, refer to FIG. 15. A red laser diode 32, a green laser diode 33, a blue laser diode 34, and an IR laser diode 31 are packaged in the free space package manner to obtain the device integrating the RGB light source 10 and the IR light source 11. Six light beam splitters 36 are further integrated onto the integrated device, so that an IR laser light beam transmitted by the IR laser diode 31, a red laser light beam transmitted by the red laser diode 32, a green laser light beam transmitted by the green laser diode 33, and a blue laser light beam transmitted by the blue laser diode 34 are output from the integrated device together after being combined by the six light beam splitters 36. The output laser light beam includes an RGB display light ray and IR.

Figure 16:
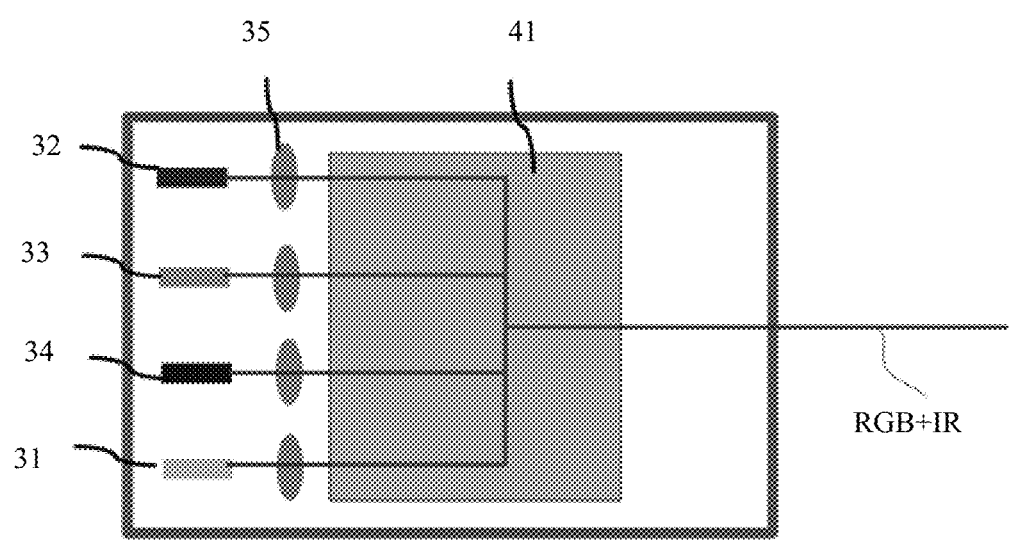
FIG. 16 is a schematic diagram 3 of a hardware integration solution of an RGB light source and an IR light source according to this application.

For silicon photonics integration package of the device integrating the RGB light source 10 and the IR light source 11, refer to FIG. 16. A red laser diode 32, a green laser diode 33, a blue laser diode 34, and an IR laser diode 31 are packaged in a silicon photonics integration manner to obtain the device integrating the RGB light source 10 and the IR light source 11. Four collimation lens 35 and one silicon photonic chip 41 are integrated onto the integrated device, so that an IR laser light beam transmitted by the IR laser diode 31, a red laser light beam transmitted by the red laser diode 32, a green laser light beam transmitted by the green laser diode 33, and a blue laser light beam transmitted by the blue laser diode 34 are transmitted to the silicon photonic chip 41 by using the four collimation lens 35, and are output from the integrated device together after being combined by an optical waveguide structure on the silicon photonic chip 41. The output laser light beam includes an RGB display light ray and IR.

Beam scanner 12: sequentially scans, along a preconfigured scanning path within a corresponding modulation cycle as instructed by the controller, IR and an RGB display light ray that are captured; and projects the scanned IR and RGB display light ray onto the entrance pupil optical apparatus 13. The scanning path of the beam scanner 12 may be a scanning path corresponding to row-by-row scanning shown in FIG. 11, may be a scanning path corresponding to grid scanning shown in FIG. 12, or may be a scanning path corresponding to spiral scanning shown in FIG. 13.

Optionally, the beam scanner 12 may be a high-frequency scanning apparatus based on an MEMS two-dimensional galvanometer. The MEMS high-frequency scanning apparatus has a high-frequency two-dimensional scanning function, and is implemented by using a two-dimensional MEMS scanning engine (Scanning Mirror) in an electromagnetic driving manner, a static driving manner, a piezoelectric driving manner, an electrothermal driving manner, or the like. In the MEMS high-frequency scanning apparatus, usually a suspended micro-galvanometer surface is arranged on polycrystalline silicon, and a cantilever beam structure is disposed to connect the galvanometer from both sides. Then the galvanometer is driven to rotate in an electromagnetic driving manner, a static driving manner, a piezoelectric driving manner, an electrothermal driving manner, or the like. Incident light is incident at a fixed angle, and diverges at different angles after being deflected by the galvanometer. During work, a beam transmitted by the RGB light source is subject to two-dimensional reflection along a known scanning path of the MEMS high-frequency scanning apparatus, and a scanning light ray is formed and projected into space.

Optionally, the beam scanner 12 may alternatively be a high-frequency scanning apparatus based on optical fiber scanning. In optical fiber scanning, an optical fiber is clamped by using a high-frequency driver, so that the optical fiber is driven to vibrate at a high frequency to form a scanning light ray for output.

Optionally, the beam scanner 12 may be alternatively implemented by a two-dimensional reflection beam scanner 12 using a driving manner such as a Lamb wave.

Entrance pupil optical apparatus 13: not only can reflect an RGB display light ray with a wavelength in a visible-light band, but also can reflect IR with a wavelength in an infrared band, so that the reflected RGB display light ray is imaged on a retina after passing through a pupil 153, and the reflected IR covers most area of the eyeball 15 of the human eye to illuminate the eyeball 15.

An RGB reflection function and an IR reflection function of the entrance pupil optical apparatus 13 are implemented by a functional film disposed on an optical lens.

Figure 17:
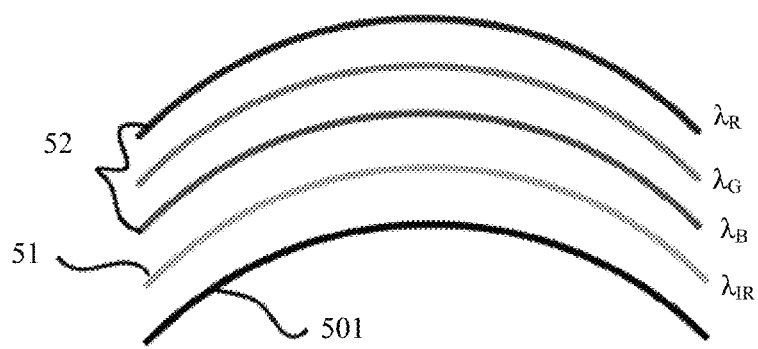
FIG. 17 is a schematic structural diagram 1 of an entrance pupil optical apparatus according to this application.

Optionally, as shown in FIG. 17, the entrance pupil optical apparatus 13 includes an optical lens 501 and a first curved-surface reflection film 51 and a second curved-surface reflection film 52 that are disposed on the optical lens 501. The first curved-surface reflection film 51 reflects IR projected onto the entrance pupil optical apparatus 13, so that the reflected IR covers the eyeball 15 at a preset angle. The second curved-surface reflection film 52 reflects an RGB display light ray projected onto the entrance pupil optical apparatus 13, so that the reflected RGB display light ray is imaged on a retina after passing through a pupil 153 of the eyeball 15. The first curved-surface reflection film 51 can reflect IR with a wavelength in the first band, and the second curved-surface reflection film 52 can reflect an RGB display light ray with a wavelength in the second band. The first curved-surface reflection film 51 on the entrance pupil optical apparatus 13 is of a monolayer film structure, and the first curved-surface reflection film 51 can reflect the IR with a wavelength in the first band. The second curved-surface reflection film 52 is of a three-layer structure, and the three-layer structure reflects the RGB display light ray with a wavelength in the second band.

Optionally, the first band is an infrared band or a near-infrared band, and the second band is a visible-light band. The RGB display light ray is modulated light of red light, green light, and blue light. A wavelength of the RGB display light ray includes wavelengths of three types of monochromatic light. A wavelength of red light is in a first sub-band, a wavelength of green light is in a second sub-band, and a wavelength of blue light is in a third sub-band. For example, a wavelength $\lambda_R$ of red light is equal to 640 nm, a wavelength $\lambda_G$ of green light is equal to 532 nm, a wavelength $\lambda_B$ of blue light is equal to 420 nm, and a wavelength $\lambda_{IR}$ of IR is equal to 850 nm. No interference is caused to a human eye when the 850-nm IR light illuminates the human eye.

The illumination light ray does not pass through the pupil 153 to reach the retina 154 like the RGB display light ray, but illuminates the human eye more widely, so that a convergence fiscal length of the reflected IR is greater than a convergence fiscal length of the reflected RGB display light ray. Therefore, curvature of the first curved-surface reflection film 51 is greater than curvature of the second curved-surface reflection film 52.

Figure 18:
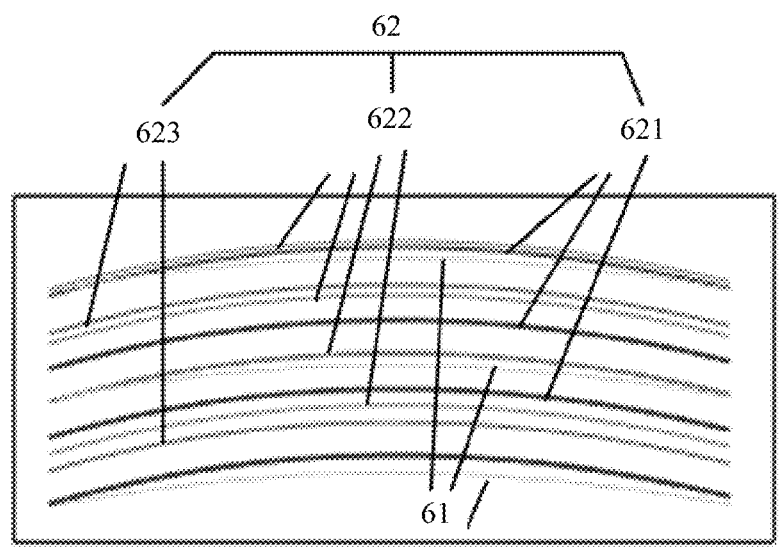
FIG. 18 is a schematic structural diagram 2 of an entrance pupil optical apparatus according to this application.

Optionally, as shown in FIG. 18, a first holographic film 61 and a second holographic film 62 that are stacked are disposed on the entrance pupil optical apparatus 13. The first holographic film 61 reproduces IR that is projected onto the entrance pupil optical apparatus 13 and whose wavelength is in the first band, so that the produced IR covers the eyeball 15 at a preset angle. The second holographic film 62 reproduces an RGB display light ray that is projected onto the entrance pupil optical apparatus 13 and whose wavelength is in the second band, so that the reproduced RGB display light ray is imaged on the retina after passing through the pupil 153 of the eyeball 15.

The first holographic film 61 reproduces the received IR with a wavelength in the first band, to generate reproduced light corresponding to the received IR. The generated reproduced light corresponding to the received IR illuminates the eyeball 15.

The second band includes a first sub-band, a second sub-band, and a third sub-band. As shown in FIG. 18, the second holographic film 62 includes a first holographic sub-film 621, a second holographic sub-film 622, and a third holographic sub-film 623 that are stacked. The first holographic sub-film 621 reproduces a received RGB display light ray that is in the first sub-band, to generate first reproduced light; the second holographic sub-film 622 reproduces a received RGB display light ray that is in the second sub-band, to generate second reproduced light; and the third holographic sub-film 623 reproduces a received RGB display light ray that is in the third sub-band, to generate third reproduced light.

It should be noted that the holographic film described in this application is a micro-nano thin film, and a refractive index and/or light transmittance of the holographic film is variable. Specifically, the first holographic film 61 is made by performing exposing processing on an optical polymer substrate based on an interference fringe with a wavelength of the IR; and the second holographic film 62 is made by performing exposing processing on an optical polymer substrate based on an interference fringe with a wavelength of the display light ray. The first holographic sub-film 621 is made by performing exposing processing on the optical polymer substrate based on an interference fringe with a wavelength of the display light ray that is in the first sub-band. The second holographic sub-film 622 is made by performing exposing processing on the optical polymer substrate based on an interference fringe with a wavelength of the display light ray that is in the second sub-band. The third holographic sub-film 623 is made by performing exposing processing on the optical polymer substrate based on an interference fringe with a wavelength of the display light ray that is in the third sub-band.

For example, $\lambda_R$=640 nm, $\lambda_G$=532 nm, $\lambda_B$=420 nm, and $\lambda_{IR}$=1000 nm. An optical polymer substrate with a refractive index of 1.x (the refractive index is a non-critical index) is selected. A strongly coherent laser light source with a wavelength of 1000 nm is used, to obtain an interference fringe with a wavelength of 500 nm (½) or 250 nm (¼) through interference, and then the organic polymer substrate is exposed by using the interference fringe, to induce a change in the refractive index of the substrate, so as to obtain the first holographic film 61. A strongly coherent laser light source with a wavelength of 640 nm is used, to obtain an interference fringe with a wavelength of 320 nm (½) or 160 nm (¼) through interference, and then the organic polymer substrate is exposed by using the interference fringe, to induce a change in the refractive index of the substrate, so as to obtain the first holographic sub-film 621. The strongly coherent laser light source with a wavelength of 532 nm is used, to obtain an interference fringe with a wavelength of 266 nm (½) or 133 nm (¼) through interference, and then the organic polymer substrate is exposed by using the interference fringe, to induce a change in the refractive index of the substrate, so as to obtain the second holographic sub-film 622. The strongly coherent laser light source with a wavelength of 420 nm is used, to obtain an interference fringe with a wavelength of 210 nm (½) or 105 nm (¼) through interference, and then the organic polymer substrate is exposed by using the interference fringe, to induce a change in the refractive index of the substrate, so as to obtain the third holographic sub-film 623.

The first holographic film 61, the first holographic sub-film 621, the second holographic sub-film 622, and the third holographic sub-film 623 that are sequentially made on the organic polymer substrate can perform reproduction for $\lambda_R$=1000 nm, $\lambda_R$=640 nm, $\lambda_G$=532 nm, and $\lambda_B$=420 nm sequentially, so that reproduced IR with the wavelength $\lambda_{IR}$=1000 nm covers the eyeball 15 at a preset angle, and reproduced RGB display light rays with wavelengths $\lambda_R$=640 nm, $\lambda_G$=532 nm, $\lambda_B$=420 nm are imaged on the retina after passing through the pupil 153 of the eyeball 15. Specifically, the first holographic film 61 reproduces the received IR with a wavelength of 1000 nm, to generate reproduced light corresponding to the received IR with a wavelength of 1000 nm. The generated reproduced light corresponding to the received IR with a wavelength of 1000 nm illuminates the eyeball 15. The generated reproduced light corresponding to the received IR with a wavelength of 1000 nm illuminates the eyeball 15. A holographic interference fringe of the first holographic sub-film 621 reproduces a received display light ray with the wavelength $\lambda_R$=640 nm, and generates first reproduced light; a holographic interference fringe of the second holographic sub-film 622 reproduces a received display light ray with a wavelength $\lambda_G$=532 nm, and generates second reproduced light; and a holographic interference fringe of the third holographic sub-film 623 reproduces a received display light ray with a wavelength $\lambda_B$=420 nm, and generates third reproduced light. The generated first reproduced light, second reproduced light, and third reproduced light are imaged on the retina after passing through the pupil 153 of the eyeball 15.

Optionally, a first diffraction optical waveguide micro-nano structure and a second diffraction optical waveguide micro-nano structure that are stacked are disposed on the entrance pupil optical apparatus 13. The first diffraction optical waveguide micro-nano structure refracts IR projected onto the entrance pupil optical apparatus 13, so that the refracted IR covers the eyeball 15 at a preset angle; and the second diffraction optical waveguide micro-nano structure refracts an RGB display light ray projected onto the entrance pupil optical apparatus 13, so that the refracted RGB display light ray is imaged on the retina after passing through the pupil 153 of the eyeball 15. For specific content of the first diffraction optical waveguide micro-nano structure and the second diffraction optical waveguide micro-nano structure, refer to content of the invention. Details are not repeated herein.

It should be further noted that a diffraction fringe of the first diffraction optical waveguide micro-nano structure refracts or reflects a received illumination light ray, and generates refracted light corresponding to the received illumination light ray, and the generated refracted light corresponding to the received illumination light ray illuminates the eyeball 15; a diffraction fringe of a first diffraction optical waveguide micro-nano sub-structure refracts or reflects the received display light ray that is in the first sub-band, and generates first refracted light, and the generated first refracted light is imaged on the retina after passing through the pupil 153 of the eyeball 15; a diffraction fringe of a second diffraction optical waveguide micro-nano sub-structure refracts or reflects the received display light ray that is in the second sub-band, and generates second refracted light, and the generated second refracted light is imaged on the retina after passing through the pupil 153 of the eyeball 15; and a diffraction fringe of a third diffraction optical waveguide micro-nano sub-structure refracts or reflects the received display light ray that is in the third sub-band, and generates third refracted light, and the generated third refracted light is imaged on the retina after passing through the pupil 153 of the eyeball 15.

The photoelectric detector 14 receives IR reflected by the eyeball 15 at different angles, collects receive optical power values of the received IR at collection time points of a preset detection cycle, and sends the collected receive optical power values to the controller. An application circuit of the photoelectric detector 14 is a typical PD circuit. In terms of parameters, detection sensitivity and a measuring range of the PD need to be determined with reference to a specific IR LD specification and reflectivity of the cornea 151 of the human eye. Because both an illumination frequency of the IR and a collection frequency of the photoelectric detector 14 can be configured flexibly, within each image frame of eye movement, a line-of-sight location of the eyeball 15 can be precisely recognized once sufficient data is sampled.

The controller is configured to: receive the receive optical power value sent by the photoelectric detector 14, determine, based on the receive optical power value, an optical power reference value that satisfies a specified functional relationship with the receive optical power value, and determine an eyeball 15 line-of-sight direction that matches the optical power reference value as a current gaze direction of the eyeball 15 based on a prestored one-to-one matching relationship between a plurality of eyeball gaze directions and a plurality of optical power reference values.

Optionally, an instruction signal sent by the controller comes from the host 506. The host 506 further loads driver software and an eyeball tracking algorithm, to perform an eyeball tracking method process.

Optionally, the controller performs, based on an optical power ratio algorithm, a first method process of eyeball tracking, which specifically includes the following steps.

Step 101: Receive the J receive optical power values collected by the photoelectric detector 14 within the $H^{th}$ detection cycle.

Step 102: Obtain a transmit optical power value corresponding to each of the J receive optical power values, where the transmit optical power value is an optical power value of an illumination light ray transmitted by the illumination light source at a collection time point of the receive optical power value.

Step 103: Determine an optical power reference value for the $H^{th}$ detection cycle based on the transmit optical power value and the receive optical power value, where the optical power reference value is a ratio of each of the J receive optical power values to the corresponding transmit optical power value.

Step 104: Determine, in prestored optical power reference values for all of a plurality of detection cycles, an optical power reference value for a target detection cycle that has a highest similarity to the optical power reference value for the $H^{th}$ detection cycle, where the plurality of detection cycles include the target detection cycle.

There is a one-to-one correspondence between J optical power reference values collected within the $H^{th}$ detection cycle and J collection time points of the $H^{th}$ detection cycle, and a prestored optical power reference value for each detection cycle includes a one-to-one correspondence between J collection time points and J optical power reference values of each detection cycle. That the optical power reference value for the target detection cycle has a highest similarity to the optical power reference value for the $H^{th}$ detection cycle means that a correspondence between J collection time points and J optical power reference values of the target detection cycle has a highest similarity to the correspondence between the J collection time points and the J optical power reference values of the $H^{th}$ detection cycle.

Step 105: Determine, as a current gaze direction of the eyeball 15, an eyeball gaze direction corresponding to the prestored optical power reference value for the target detection cycle.

Optionally, the controller performs, based on a largest receive optical power value algorithm, a second method process of eyeball tracking, which specifically includes the following steps.

Step 201: Obtain the J receive optical power values that are collected within the H$^{th}$ detection cycle and that are sent by the photoelectric detector 14.

Step 202: Determine an optical power reference value for the H$^{th}$ detection cycle based on the J receive optical power values, where the optical power reference value is a largest receive optical power value in the J receive optical power values; and determine a first correspondence between the optical power reference value for the H$^{th}$ detection cycle of the detection cycles and a corresponding collection time point.

Step 203: Determine, in a plurality of prestored correspondences, a second correspondence that has a highest similarity to the first correspondence, where the plurality of correspondences are correspondences between optical power reference values for all of a plurality of detection cycles and corresponding collection time points.

Step 204: Determine an eyeball gaze direction corresponding to the prestored second correspondence as a current gaze direction of the eyeball 15.

In this application, an IR light source 11 is placed into an existing scan-type projection RGB light source 10. When the scan-type projection apparatus is used to scan an image frame, an illumination light ray is scanned and projected along a same scanning path. The entrance pupil optical apparatus 13 is used to reflect IR, so that the reflected IR illuminates the human eye. In addition, at the other end of the IR illumination path, the photoelectric detector 14 is used to receive and perform optical power detection on the IR reflected by the eyeball 15 at different angles. For parameters of the eyeball tracking system of the AR/VR glasses, refer to Table 3. The IR light source 11 is a near-infrared laser chip, the beam scanner 12 is an MEMS high-frequency scanning apparatus, and the photoelectric detector 14 is a photodiode (PD). A size of the entire eyeball tracking system is less than 10 mm$^3$, power consumption of the entire eyeball tracking system is less than 10 mW, and costs are less than 10 dollars.

TABLE 3

| Sequence Number | Parameter | Current Technical Solution in the Industry | Solution in Embodiment 1 |
| --- | --- | --- | --- |
| 1 | Technology type | NIR LED + NIR Camera | NIR Laser + MEMS Mirror + PD |
| 2 | Dimension | >1000 mm$^3$ | <10 mm$^3$ |
| 3 | Frequency | 60-120 Hz | 60-5000 Hz |
| 4 | Precision | 0.4° | 0.25° |
| 5 | Power consumption | >100 mW | <10 mW |
| 6 | Costs | >100 USD | <10 USD |

Because of different appearances of a surface of an eyeball 15 of a person at different line-of-light locations, IR light is reflected at different angles, and receive optical power values of the received IR are also different. In this application, the photoelectric detector 14 collects the receive optical power values of the IR reflected by the eyeball 15 at different angles, and the photoelectric detector 14 is an optical power collection apparatus. In the prior art, a camera photographs a human eye, and the camera is an image collection apparatus. An optical power collection frequency of the photoelectric detector 14 is far higher than an image collection frequency of the camera in the prior art. In this application, based on the illumination system including the IR light source 11, the beam scanner 12, and the entrance pupil optical apparatus 13, the photoelectric detector 14 is used to collect an optical power of the eyeball 15 reflection light ray to perform eyeball tracking. Therefore, compared with the prior art, this application helps implement a low latency because of a higher collection frequency. Further, because the collection frequency of the photoelectric detector 14 is high, precision of eyeball tracking performed based on the collected receive optical power value is increased, compared with the prior art. Still further, because the photoelectric detector 14 is a device of a micron size or even a micro-nano size, the eyeball tracking system provided in this application further has advantages of a small size, low power consumption, and low costs. Therefore, under support of the hardware apparatus and the algorithm, a current scan-type projection apparatus can be utilized to a great extent, implementing eyeball tracking of a human eye with a small size, low power consumption, and a low latency, and resolving prior-art problems listed in Table 4.

TABLE 4

| Sequence Number | Current Technology in the Industry | Embodiment 1 of This Application |
| --- | --- | --- |
| 1 | Large size | Hardware: An IR LD and an IR PD or an IR PD group are added. Compared with a current technology in the industry, a size increment is extremely small. |
| 2 | High power consumption | Power consumption of the added LD and PD is extremely low. Compared with the current technology in the industry, such power consumption can almost be omitted. |
| 3 | Low frequency | A PD is used for sampling. Compared with a current camera-based sampling technology in the industry, a frequency can be increased by manyfold or even hundredfold. |
| 4 | High costs | Compared with the current technology in the industry, costs are greatly reduced. |

Embodiment 2

Based on a same inventive concept, this application provides AR/VR glasses that have both a retinal projection function and a high-precision eyeball tracking function. What is different from Embodiment 1 lies in that: A photoelectric detector 14, an RGB light source 10, and an IR light source 11 constitute an integrated device, implementing IR transmission and reception in one piece and further implementing smaller and simpler hardware. Disadvantages are that a light source is more complex, and because the photoelectric detector 14 is disposed on an optical path of scattered light of IR, intensity of reflected light of received IR and sensitivity are lower.

Embodiment 3

Figure 19:
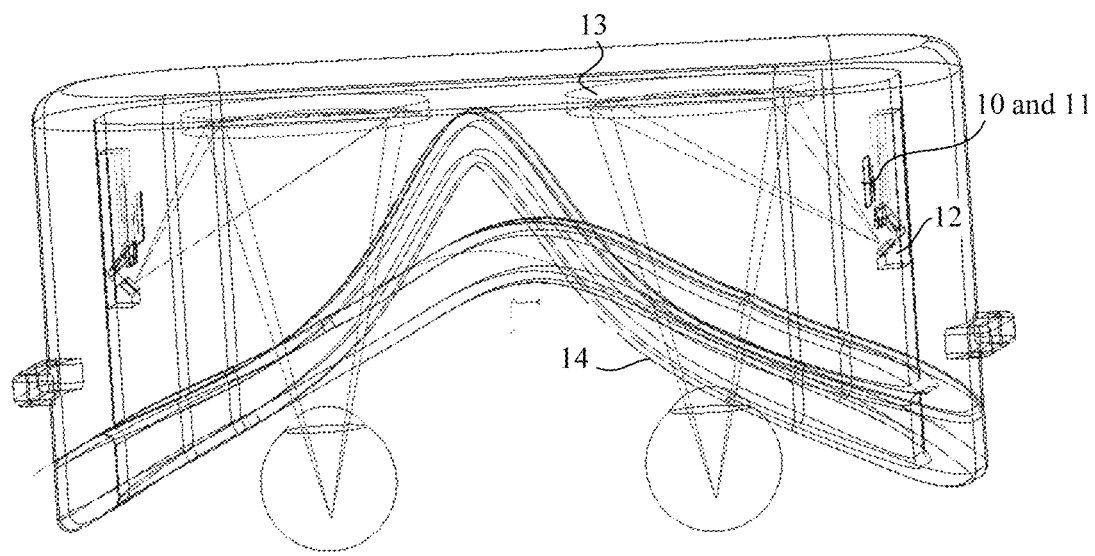
FIG. 19 is a schematic structural diagram 1 of a VR HMD that is a product form of an eyeball tracking system according to this application.

Based on a same inventive concept, this application provides a VR HMD that has both a retinal projection function and a high-precision eyeball tracking function. As shown in FIG. 19, what is different from Embodiment 1 lies in that: An RGB light source 10, an IR light source 11, a beam scanner 12, an entrance pupil optical apparatus 13, and a photoelectric detector 14 all are disposed inside a housing of the VR HMD. Because of relatively large space inside the housing, a mounting location of the photoelectric detector 14 can be set flexibly, and a location favorable for receiving IR reflected by an eyeball 15 is preferred. Except for locations of the RGB light source 10, the IR light source 11, the beam scanner 12, the entrance pupil optical apparatus 13, and the photoelectric detector 14, other content is the same as that in Embodiment 1, and details are not repeated herein.

Embodiment 4

Figure 20:
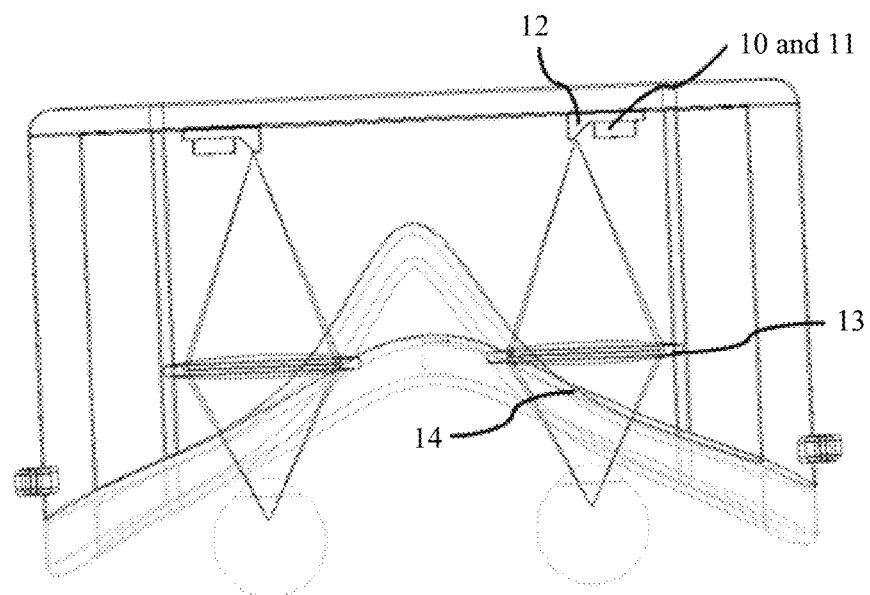
FIG. 20 is a schematic structural diagram 2 of a VR HMD that is a product form of an eyeball tracking system according to this application.

Based on a same inventive concept, this application provides a VR HMD that has both a retinal projection function and a high-precision eyeball tracking function. As shown in FIG. 20, an RGB light source 10, an IR light source 11, a beam scanner 12, an entrance pupil optical apparatus 13, and a photoelectric detector 14 that are included in each eyeball tracking system all are disposed inside a housing of the VR HMD. What is different from Embodiment 3 lies in that: The entrance pupil optical apparatus 13 uses an optical path of a direct-transmission convex mirror, that is, after the beam scanner 12 projects an RGB display light ray and IR onto the entrance pupil optical apparatus 13, the RGB display light ray and the IR are not reflected by the entrance pupil optical apparatus 13, but are directly converged on a human eye after directly penetrating through the entrance pupil optical apparatus 13. The RGB display light ray and the IR have different convergence levels, so that after penetrating through the entrance pupil optical apparatus 13, the RGB display light ray illuminates the human eye and the IR passes through a pupil 153 of an eyeball 15 for retinal imaging. The entrance pupil optical apparatus 13 in Embodiment 1 to Embodiment 3 all use a reflection optical path. The entrance pupil optical apparatus 13 using the optical path of the direct-transmission convex mirror is easier to implement, but the product is thicker. The transmission optical path and the reflection optical path are two architectures that are optically equivalent but have different physical forms. Both have a same optical distance, but a product built based on the reflection optical path is thinner.

Embodiment 5

Figure 21:
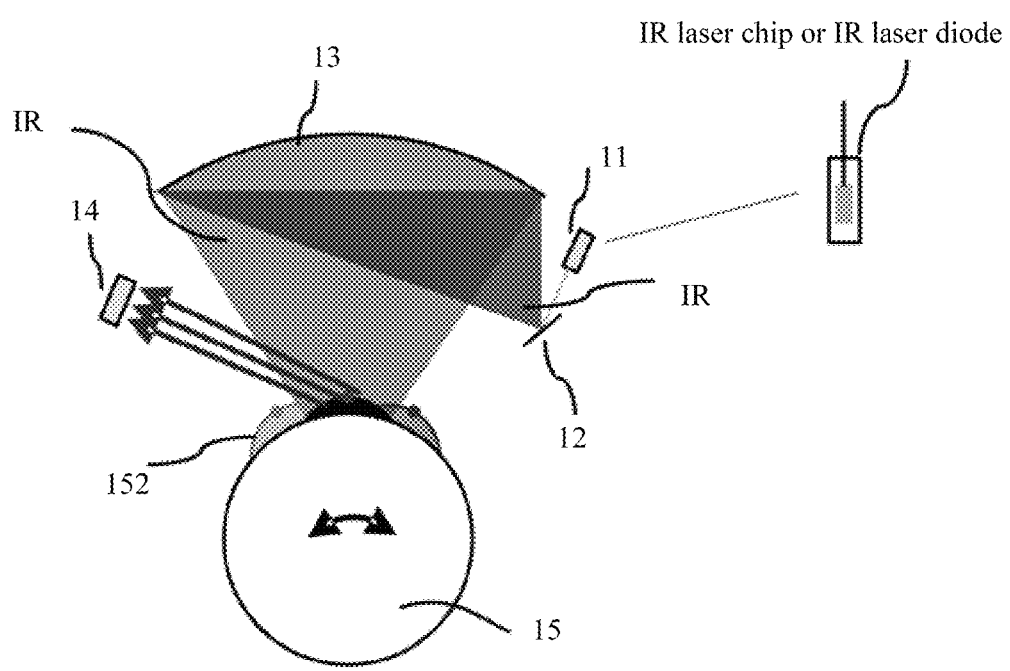
FIG. 21 is a schematic structural diagram 3 of an eyeball tracking system according to this application.

Based on a same inventive concept, this application provides an eyeball tracking system having a high-precision eyeball tracking function. What is different from Embodiment 1 lies in that: No RGB light source 10 is included. The eyeball tracking system may be applied to other electronic products, for example, a mobile phone, a computer, and some medical products such as an eye tracker, so that these products have an eyeball tracking function. As shown in FIG. 21, the eyeball tracking system includes an IR light source 11, an entrance pupil optical apparatus 13, a beam scanner 12, a photoelectric detector 14, and a controller (not shown in FIG. 21). The controller is electrically connected to the IR light source 11, the beam scanner 12, and the photoelectric detector 14. An illumination system including the IR light source 11, the beam scanner 12, and the entrance pupil optical apparatus 13 illuminates an eyeball 15.

An illumination optical path along which the illumination system including the IR light source 11, the beam scanner 12, and the entrance pupil optical apparatus 13 illuminates the eyeball 15 is specifically: The IR light source 11 transmits IR to the beam scanner 12, the beam scanner 12 projects the received IR onto the entrance pupil optical apparatus 13, and the entrance pupil optical apparatus 13 reflects, reproduces, or refracts the received IR, so that the reflected, reproduced, or refracted IR illuminates the eyeball 15, and is reflected at different angles by the eyeball 15 when the reflected, reproduced, or refracted IR illuminates the eyeball 15.

An eyeball tracking algorithm execution system including the photoelectric detector 14 and the controller is specifically: The photoelectric detector 14 collects receive optical power values of the IR reflected by the eyeball 15 at different angles, and sends the receive optical power values to the controller; and the controller receives the receive optical power values sent by the photoelectric detector 14, determines, based on the receive optical power values, an optical power reference value that satisfies a specified functional relationship with the receive optical power values, and determines an eyeball 15 line-of-sight direction that matches the optical power reference value as a current gaze direction of the eyeball 15 based on a prestored one-to-one matching relationship between a plurality of eyeball gaze directions and a plurality of optical power reference values.

In this embodiment, hardware implementation solutions of the beam scanner 12 and the photoelectric detector 14 are the same as those in Embodiment 1, and details are not repeated herein. A process in which the controller performs an eyeball tracking method based on an optical power ratio algorithm and a largest receive optical power value algorithm is the same as that in Embodiment 1, and details are not repeated herein.

A first difference from Embodiment 1 lies in that: Because no RGB light source 10 is included, the IR light source 11 is an independent light source. The IR light source 11 is a resonant-cavity pump laser, a semiconductor laser chip, or a light-emitting diode capable of transmitting infrared or near-infrared laser light.

A second difference from Embodiment 1 lies in that: Because no RGB light source 10 is included, a functional film disposed on the entrance pupil optical apparatus 13 has only an IR reflection function.

Figure 22:
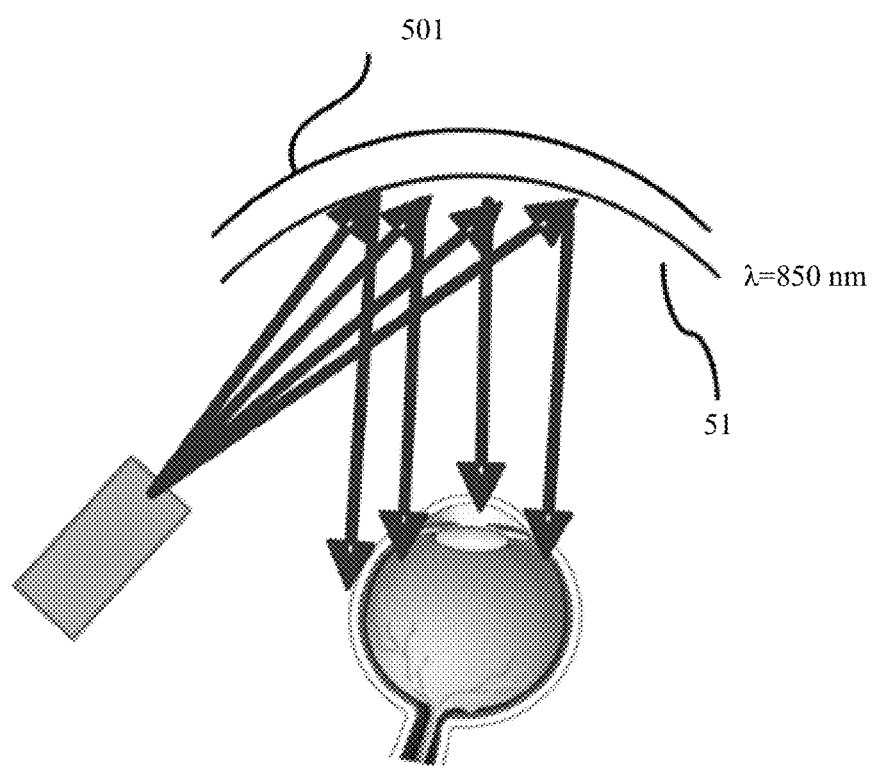
FIG. 22 is a schematic diagram 3 of a product form of an entrance pupil optical apparatus according to this application.

Optionally, the functional film disposed on the entrance pupil optical apparatus 13 reflects IR that is projected onto the entrance pupil optical apparatus 13 and whose wavelength is in a first band, so that the reflected IR covers the eyeball 15 at a preset angle. For example, as shown in FIG. 22, the entrance pupil optical apparatus 13 includes an optical lens 501 and a first curved-surface reflection film 51 disposed on the optical lens 501. The optical lens 501 is a lens with a free-form surface. The first curved-surface reflection film 51 is of a monolayer film structure, and is capable of reflecting IR with a wavelength in the first band, so that the reflected IR light ray covers the eyeball 15 at a preset angle.

Figure 23:
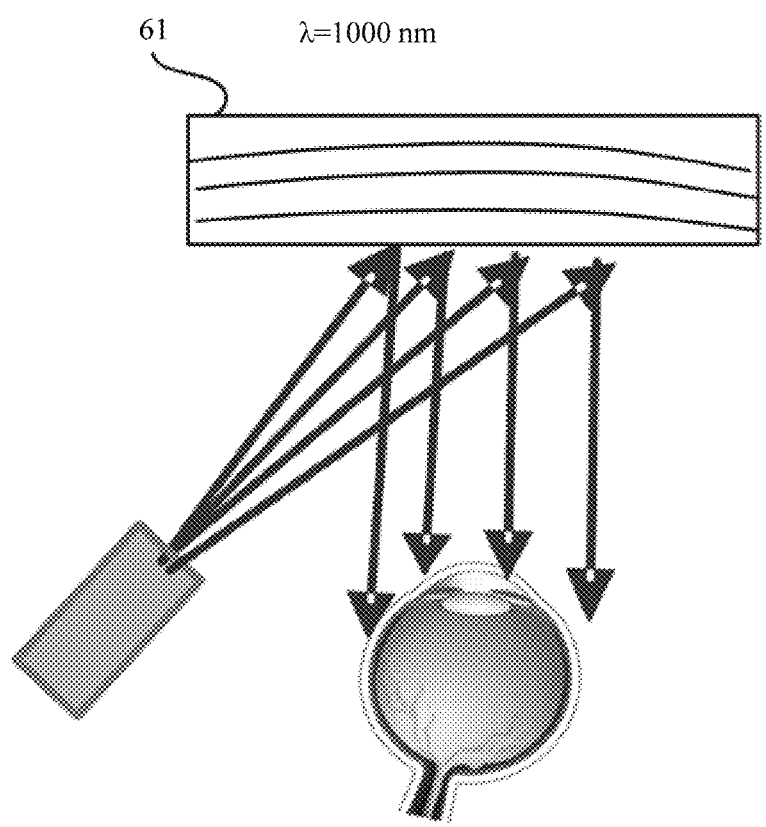
FIG. 23 is a schematic diagram 4 of a product form of an entrance pupil optical apparatus according to this application.

Optionally, the first curved-surface reflection film 51 disposed on the entrance pupil optical apparatus 13 reproduces IR that is projected onto the entrance pupil optical apparatus 13 and whose wavelength is in a first band, so that the reproduced IR covers the eyeball 15 at a preset angle. For example, the functional film is a holographic film capable of reproducing the projected IR. For example, as shown in FIG. 23, the functional film disposed on the entrance pupil optical apparatus 13 is a first holographic film 61. A method for making the first holographic film is: selecting an optical polymer substrate whose refractive index can change, using a strongly coherent laser light source with a wavelength of 1000 nm, to obtain an interference fringe with a wavelength of 500 nm (½) or 250 nm (¼) through interference, using the interference fringe to expose the organic polymer substrate, and inducing a change in refractive index of the substrate, to obtain the holographic film. A holographic interference fringe on the holographic film reproduces the received IR with a wavelength of 1000 nm, to generate reproduced light corresponding to the received IR with a wavelength of 1000 nm. The generated reproduced light corresponding to the received IR with a wavelength of 1000 nm illuminates the eyeball 15.

Optionally, the functional film disposed on the entrance pupil optical apparatus 13 may alternatively be another film that can refract IR that is projected onto the entrance pupil optical apparatus 13 and whose wavelength is in a first band, so that the reflected IR covers the eyeball 15 at a preset angle. For example, the functional film is a diffraction optical waveguide micro-nano structure capable of refracting or reflecting the IR that is in the first band.

A third difference from Embodiment 1 lies in that: Because no RGB light source 10 is included, the controller sends coordinated-operation instruction signals to the IR light source 11, the photoelectric detector 14, and the beam scanner 12. Details are as follows:

The IR light source 11 transmits IR to the beam scanner 12 within the $H^{th}$ detection cycle of the photoelectric detector 14 according to an instruction signal sent by the controller. The photoelectric detector 14 collects J receive optical power values within the $H^{th}$ detection cycle according to an instruction signal sent by the controller, so that the controller determines a current gaze direction of the eyeball 15 based on the J receive optical power values collected by the photoelectric detector 14 within the $H^{th}$ detection cycle. The beam scanner 12 scans IR within the $H^{th}$ detection cycle of the photoelectric detector 14 according to an instruction signal sent by the controller, and projects the scanned IR onto the entrance pupil optical apparatus 13.

It should be noted that because the IR reflected by the eyeball 15 when the IR reflected by the entrance pupil optical apparatus 13 illuminates the eyeball 15 is reflected at different angles, and a location of the photoelectric detector 14 is fixed, to collect receive optical power values of the IR reflected at different angles, a unique collection time point needs to be configured for the receive optical power values of the IR reflected at different angles. A reflection angle of the IR reflected from a surface of the eyeball 15 is related to a location at which the IR illuminates the eyeball 15. From a reverse optical path of the IR that illuminates the eyeball 15, it can be learned that the location at which the IR illuminates the eyeball 15 is corresponding to a location at which the IR is projected onto the entrance pupil optical apparatus 13, the location at which the IR is projected onto the entrance pupil optical apparatus 13 is corresponding to a location on a scanning path along which the IR is scanned by the beam scanner 12, and the location on the scanning path along which the IR is scanned by the beam scanner 12 is corresponding to an illumination time point of the IR. Therefore, similar to a configuration of the detection cycle of the photoelectric detector 14 and a configuration of the collection time point included in the detection cycle in Embodiment 1, in this application, to collect the receive optical power values of the IR reflected at different angles, a collection time point of the photoelectric detector 14 may be determined based on a modulation time point of M (pixel rows)×N (pixel columns) pixels in one frame of two-dimensional image, so that J collection time points of one detection cycle are corresponding to the IR reflected from J different angles.

Correspondingly, in this application, the IR light source 11 may transmit IR continuously or discontinuously within one detection cycle of the photoelectric detector 14. When the IR light source 11 transmits IR discontinuously, an illumination time point of the IR transmitted by the IR light source 11 is determined based on a configuration of a collection time point of the photoelectric detector 14, that is, a plurality of illumination time points of the IR transmitted within one detection cycle of the photoelectric detector 14 are in a one-to-one correspondence with a plurality of collection time points of one detection cycle of the photoelectric detector 14.

Optionally, if IR transmitted by the IR light source 11 within each detection cycle includes W illumination time points, within any detection cycle, a time interval between the $F^{th}$ illumination time point in the W illumination time points and an earliest illumination time point in the W illumination time points is equal to a time interval between a collection time point of the $L^{th}$ receive optical power value collected by the photoelectric detector 14 within the detection cycle and a start collection time point of the detection cycle.

Correspondingly, when the plurality of illumination time points of the IR transmitted by the IR light source 11 are in a one-to-one correspondence with the plurality of collection time points of one detection cycle of the photoelectric detector 14, the beam scanner 12 needs to perform two-dimensional scanning on the IR transmitted by the IR light source 11 within the detection cycle of the photoelectric detector 14.

In this embodiment, the photoelectric detector 14 collects the receive optical power values of the IR reflected by the eyeball 15 at different angles, and the photoelectric detector 14 is an optical power collection apparatus. In the prior art, a camera photographs a human eye, and the camera is an image collection apparatus. An optical power collection frequency of the photoelectric detector 14 is far higher than an image collection frequency of the camera in the prior art. In this application, based on the illumination system including the IR light source 11, the beam scanner 12, and the entrance pupil optical apparatus 13, the photoelectric detector 14 is used to collect an optical power of an eyeball 15 reflection light ray to perform eyeball tracking. Therefore, compared with the prior art, this application helps implement a low latency because of a higher collection frequency. Further, because the collection frequency of the photoelectric detector 14 is high, precision of eyeball tracking performed based on the collected receive optical power value is increased, compared with the prior art. Still further, because the photoelectric detector 14 is a device of a micron size or even a micro-nano size, the eyeball tracking system provided in this application further has advantages of a small size, low power consumption, and low costs.

Embodiment 6

Figure 24:
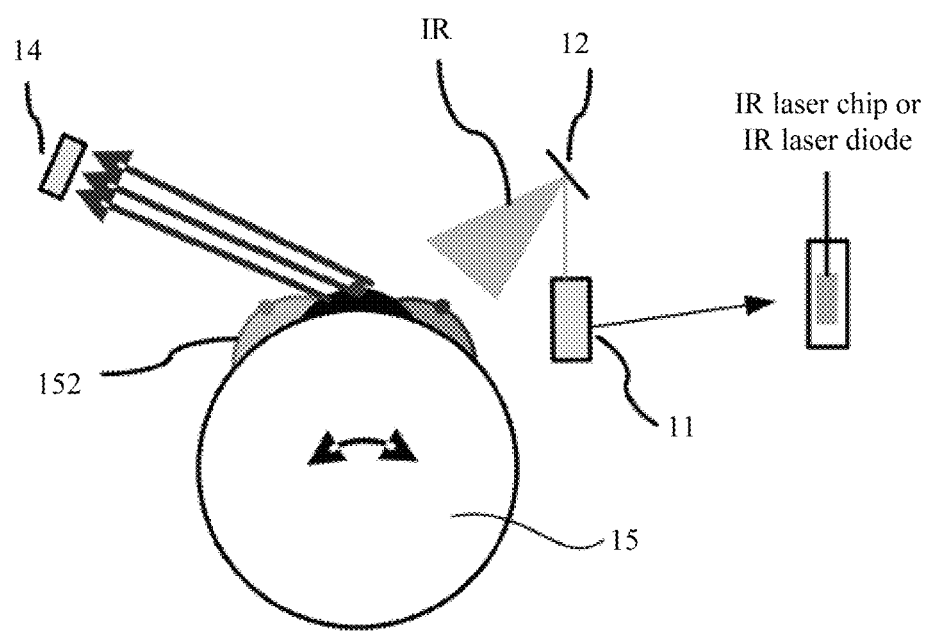
FIG. 24 is a schematic structural diagram 4 of an eyeball tracking system according to this application.

Based on a same inventive concept, this application provides an eyeball tracking system having a high-precision eyeball tracking function. What is different from Embodiment 1 lies in that: Neither an RGB light source 10 nor an entrance pupil optical apparatus 13 is included. The eyeball tracking system may be applied to other electronic products, for example, a mobile phone, a computer, and some medical products such as an eye tracker, so that these products have an eyeball tracking function. As shown in FIG. 24, the eyeball tracking system includes an IR light source 11, a beam scanner 12, a photoelectric detector 14, and a controller. The controller is electrically connected to the IR light source 11, the beam scanner 12, and the photoelectric detector 14. An illumination system including the IR light source 11 and the beam scanner 12 illuminates an eyeball 15. The photoelectric detector 14 and the controller constitute an eyeball tracking algorithm execution system.

An illumination optical path along which the illumination system including the IR light source 11, the beam scanner 12, and the entrance pupil optical apparatus 13 illuminates the eyeball 15 is specifically: The IR light source transmits IR to the beam scanner 12; and the beam scanner 12 projects the IR, so that the projected IR illuminates the eyeball 15 at a preset angle, and when illuminating the eyeball 15, the projected IR is reflected by the eyeball 15 at different angles.

The eyeball tracking algorithm execution system including the photoelectric detector 14 and the controller is specifically: The photoelectric detector 14 collects receive optical power values of the IR reflected by the eyeball 15 at different angles, and sends the receive optical power values to the controller; and the controller receives the receive optical power values sent by the photoelectric detector 14, determines, based on the receive optical power values, an optical power reference value that satisfies a specified functional relationship with the receive optical power values, and determines an eyeball 15 line-of-sight direction that matches the optical power reference value as a current gaze direction of the eyeball 15 based on a prestored one-to-one matching relationship between a plurality of eyeball gaze directions and a plurality of optical power reference values.

In this embodiment, a process in which the controller performs an eyeball tracking method based on an optical power ratio algorithm and a largest receive optical power value algorithm is the same as that in Embodiment 1, and details are not repeated herein.

In this embodiment, hardware implementation solutions of the beam scanner 12 and the photoelectric detector 14 are the same as those in Embodiment 1, and details are not repeated herein. For example, a currently mature MEMS high-frequency scanning apparatus may be used as the beam scanner 12, or an optical fiber scanner or another similar scanner may be used. It should be noted that in this application, wavelength matching needs to be performed between the photoelectric detector 14 and the IR light source 11, and a PD with proper sensitivity is selected. It is required that the PD be capable of precisely sampling an intensity value of light with a specified wavelength at a high frequency and effectively avoiding interference of ambient light.

In this embodiment, hardware implementation solutions of the beam scanner 12 and the photoelectric detector 14 are the same as those in Embodiment 1, and details are not repeated herein. A specific implementation solution of the eyeball tracking algorithm is the same as that in Embodiment 1, and details are not repeated herein.

A difference from Embodiment 1 lies in that: Because no RGB light source 10 is included, the IR light source 11 is an independent light source. The IR light source 11 is a resonant-cavity pump laser, a semiconductor laser chip, or a light-emitting diode capable of transmitting infrared or near-infrared laser light; or the IR light source 11 is any other light source capable of transmitting infrared or near-infrared light. The IR light source 11 may be an IR laser chip or an LED light source that transmits light from a side or transmits light from a vertical plane, and use a collimation lens 35 along a given optical path to shape a beam.

A third difference from Embodiment 1 lies in that: Because no RGB light source 10 is included, the controller sends coordinated-operation instruction signals to the IR light source 11, the photoelectric detector 14, and the beam scanner 12. Specific content of sending, by the controller, coordinated-operation instruction signals to the IR light source 11, the photoelectric detector 14, and the beam scanner 12 is the same as that in Embodiment 5, and details are not repeated herein.

It should be noted that because the IR reflected by the eyeball 15 when the IR reflected by the entrance pupil optical apparatus 13 illuminates the eyeball 15 is reflected at different angles, and a location of the photoelectric detector 14 is fixed, to collect receive optical power values of the IR reflected at different angles, a unique collection time point needs to be configured for the receive optical power values of the IR reflected at different angles.

In this application, to collect the receive optical power values of the IR reflected at different angles, a configuration of a detection cycle of the photoelectric detector 14 and a configuration of a collection time point included in the detection cycle are the same as those in Embodiment 5, and details are not repeated herein. Correspondingly, a configuration of an illumination time point of the IR transmitted by the IR light source 11 within the detection cycle of the photoelectric detector 14 is the same as that in Embodiment 5, and details are not repeated herein. Correspondingly, for specific content of performing, by the beam scanner 12 within the detection cycle of the photoelectric detector 14, two-dimensional scanning on the IR transmitted by the IR light source 11, refer to Embodiment 5. Details are not repeated herein.

In this embodiment, the photoelectric detector 14 collects the receive optical power values of the IR reflected by the eyeball 15 at different angles, and the photoelectric detector 14 is an optical power collection apparatus. In the prior art, a camera photographs a human eye, and the camera is an image collection apparatus. An optical power collection frequency of the photoelectric detector 14 is far higher than an image collection frequency of the camera in the prior art. In this embodiment of this application, based on the illumination system including the IR light source 11 and the beam scanner 12, the photoelectric detector 14 is used to collect an optical power of an eyeball 15 reflection light ray to perform eyeball tracking. Therefore, compared with the prior art, this application helps implement a low latency because of a higher collection frequency. Further, because the collection frequency of the photoelectric detector 14 is high, precision of eyeball tracking performed based on the collected receive optical power value is increased, compared with the prior art. Still further, because the photoelectric detector 14 is a device of a micron size or even a micro-nano size, the eyeball tracking system provided in this application further has advantages of a small size, low power consumption, and low costs.

Based on a same inventive concept, this application further provides an eyeball tracking method applied to Embodiment 1 to Embodiment 4. The method includes the following steps:

Step 301: An illumination light source transmits an illumination light ray to a beam scanner 12, and a display light source transmits a display light ray to the beam scanner 12.

Step 302: The beam scanner 12 projects the illumination light ray and the display light ray onto an entrance pupil optical apparatus 13, so that the entrance pupil optical apparatus 13 reflects or reproduces the illumination light ray and the display light ray, the reflected or reproduced illumination light ray illuminates an eyeball 15, and the reflected or reproduced display light ray is imaged on a retina after passing through a pupil 153 of the eyeball 15.

Step 303: A photoelectric detector 14 collects a receive optical power value of an eyeball 15 reflection light ray, and sends the receive optical power value to a controller, where the eyeball 15 reflection light ray is a light ray reflected by the eyeball 15 when the reflected or reproduced illumination light ray illuminates the eyeball 15.

Step 304: The controller receives the receive optical power value sent by the photoelectric detector 14, determines, based on the receive optical power value, an optical power reference value that satisfies a specified functional relationship with the receive optical power value, and determines an eyeball 15 line-of-sight direction that matches the optical power reference value as a current gaze direction of the eyeball 15 based on a prestored one-to-one matching relationship between a plurality of eyeball gaze directions and a plurality of optical power reference values.

The eyeball tracking method is based on the same inventive concept as the eyeball tracking systems in Embodiment 1 to Embodiment 4, and principles of resolving problems are similar. Therefore, mutual reference may be made between the eyeball tracking method and specific implementation of the eyeball tracking systems in Embodiment 1 to Embodiment 4, and details are not repeated.

Based on a same inventive concept, this application further provides an eyeball tracking method applied to Embodiment 5. The method includes the following steps:

Step 401: An illumination light source transmits an illumination light ray to a beam scanner 12.

Step 402: The beam scanner 12 projects the illumination light ray onto an entrance pupil optical apparatus 13, so that the entrance pupil optical apparatus 13 reflects or reproduces the illumination light ray, and the reflected or reproduced illumination light ray illuminates an eyeball 15.

Step 403: A photoelectric detector 14 collects a receive optical power value of an eyeball 15 reflection light ray, and sends the receive optical power value to a controller, where the eyeball 15 reflection light ray is a light ray reflected by the eyeball 15 when the reflected or reproduced illumination light ray illuminates the eyeball 15.

Step 404: The controller receives the receive optical power value sent by the photoelectric detector 14, determines, based on the receive optical power value, an optical power reference value that satisfies a specified functional relationship with the receive optical power value, and determines an eyeball 15 line-of-sight direction that matches the optical power reference value as a current gaze direction of the eyeball 15 based on a prestored one-to-one matching relationship between a plurality of eyeball gaze directions and a plurality of optical power reference values.

The eyeball tracking method is based on the same inventive concept as the eyeball tracking system in Embodiment 5, and principles of resolving problems are similar. Therefore, mutual reference may be made between the eyeball tracking method and specific implementation of the eyeball tracking system in Embodiment 5, and details are not repeated.

Based on a same inventive concept, this application further provides an eyeball tracking method applied to Embodiment 6. The method includes the following steps:

Step 501: An illumination light source transmits an illumination light ray to a beam scanner 12.

Step 502: The beam scanner 12 projects the illumination light ray, so that the projected illumination light ray illuminates an eyeball 15 at a preset angle.

Step 503: A photoelectric detector 14 collects a receive optical power value of an eyeball 15 reflection light ray, and sends the receive optical power value to a controller, where the eyeball 15 reflection light ray is a light ray reflected by the eyeball 15 when the projected illumination light ray illuminates the eyeball 15.

Step 504: The controller receives the receive optical power value sent by the photoelectric detector 14, determines, based on the receive optical power value, an optical power reference value that satisfies a specified functional relationship with the receive optical power value, and determines an eyeball 15 line-of-sight direction that matches the optical power reference value as a current gaze direction of the eyeball 15 based on a prestored one-to-one matching relationship between a plurality of eyeball gaze directions and a plurality of optical power reference values.

The eyeball tracking method is based on the same inventive concept as the eyeball tracking system in Embodiment 6, and principles of resolving problems are similar. Therefore, mutual reference may be made between the eyeball tracking method and specific implementation of the eyeball tracking system in Embodiment 6, and details are not repeated.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies of this application.

What is claimed is:

1. An eyeball tracking system, comprising:
   a controller;
   an illumination light source configured to transmit an illumination light ray;
   a beam scanner configured to project the illumination light ray illuminate an eyeball at a preset angle; and
   a photoelectric detector configured to:
      collect a receive optical power value of an eyeball reflection light ray, and
      send the receive optical power value to the controller, wherein the eyeball reflection light ray is reflected by the eyeball when the projected illumination light ray illuminates the eyeball; and
   wherein the controller is configured to:
      receive the receive optical power value sent by the photoelectric detector,
      determine, based on the receive optical power value, an optical power reference value that satisfies a specified functional relationship with the receive optical power value, and
      determine an eyeball line-of-sight direction that matches the optical power reference value as a current gaze direction of the eyeball based on a prestored one-to-one matching relationship between a plurality of eyeball gaze directions and a plurality of optical power reference values.

2. The eyeball tracking system according to claim 1, wherein the illumination light ray is infrared or near-infrared light.

3. The eyeball tracking system according to claim 1, wherein the illumination light source is electrically connected to the controller to send an eighth instruction signal to the illumination light source, wherein the eighth instruction signal is used to instruct the illumination light source to transmit the illumination light ray; and wherein
   the illumination light source is configured to:
   receive the eighth instruction signal, and
   transmit the illumination light ray to the beam scanner according to the eighth instruction signal.

4. The eyeball tracking system according to claim 3, wherein the photoelectric detector is electrically connected to the controller; wherein
   the controller is further configured to send a ninth instruction signal to the photoelectric detector, wherein the ninth instruction signal is used to instruct the photoelectric detector to collect J receive optical power values within the $H'^{th}$ detection cycle, wherein H' is an integer greater than or equal to 1, and J is an integer greater than or equal to 1; and wherein the photoelectric detector is configured to receive the ninth instruction signal, and collect the J receive optical power values within the $H'^{th}$ detection cycle according to the ninth instruction signal, so that the controller determines the current gaze direction of the eyeball based on the J receive optical power values collected by the photoelectric detector within the $H'^{th}$ detection cycle, wherein for different values of H', a time interval between a collection time point of the $L^{th}$ receive optical power value in the J receive optical power values and a start collection time point of the $H'^{th}$ detection cycle is constant, wherein L is an integer greater than or equal to 1 and less than or equal to J.

5. The eyeball tracking system according to claim 4, wherein the beam scanner is electrically connected to the controller to send a tenth instruction signal to the beam scanner, wherein the tenth instruction signal is used to instruct the beam scanner to scan the illumination light ray within the $H'^{th}$ detection cycle; and wherein the beam scanner is configured to:
receive the tenth instruction signal, scan the illumination light ray within the $H'^{th}$ detection cycle according to the tenth instruction signal, and
project the scanned illumination light ray which illuminates the eyeball at a preset angle.

6. The eyeball tracking system according to claim 5, wherein
the illumination light ray transmitted by the illumination light source within each detection cycle comprises W illumination time points, wherein
within any detection cycle, a time interval between the $F^{th}$ illumination time point in the W illumination time points and an earliest illumination time point in the W illumination time points is equal to a time interval between a collection time point of the $L^{th}$ receive optical power value collected by the photoelectric detector within the detection cycle and a start collection time point of the detection cycle.

7. The eyeball tracking system according to claim 4, wherein the controller is configured to:
receive the J receive optical power values collected by the photoelectric detector within the $H'^{th}$ detection cycle;
obtain a transmit optical power value corresponding to each of the J receive optical power values, wherein the transmit optical power value is an optical power value of an illumination light ray transmitted by the illumination light source at a collection time point of the receive optical power value;
determine an optical power reference value for the $H'^{th}$ detection cycle based on the transmit optical power value and the receive optical power value, wherein the optical power reference value is a ratio of each of the J receive optical power values to the corresponding transmit optical power value;
determine, in prestored optical power reference values for all of a plurality of detection cycles, an optical power reference value for a target detection cycle that has a highest similarity to the optical power reference value for the $H'^{th}$ detection cycle, wherein the plurality of detection cycles comprise the target detection cycle; and determine, as the current gaze direction of the eyeball, an eyeball gaze direction corresponding to the prestored optical power reference value for the target detection cycle.

8. The eyeball tracking system according to claim 4, wherein the controller is configured to:
obtain the J receive optical power values that are collected within the $H'^{th}$ detection cycle and that are sent by the photoelectric detector;
determine an optical power reference value for the $H'^{th}$ detection cycle based on the J receive optical power values, wherein the optical power reference value is a largest value in the J receive optical power values;
determine a first correspondence between the optical power reference value for the $H'^{th}$ detection cycle and a corresponding collection time point;
determine, in a plurality of prestored correspondences, a second correspondence with a highest similarity to the first correspondence, wherein the plurality of correspondences are correspondences between optical power reference values for all of a plurality of detection cycles and corresponding collection time points; and
determine an eyeball gaze direction corresponding to the prestored second correspondence as the current gaze direction of the eyeball.

9. An eyeball tracking method, comprising:
transmitting, by an illumination light source, an illumination light ray to a beam scanner;
projecting, by the beam scanner, the illumination light ray onto an entrance pupil optical apparatus which reflects or reproduces the illumination light ray, wherein the reflected or reproduced illumination light ray illuminates an eyeball;
collecting, by a photoelectric detector, a receive optical power value of an eyeball reflection light ray;
sending the receive optical power value to a controller, wherein the eyeball reflection light ray is a light ray reflected by the eyeball when the reflected or reproduced illumination light ray illuminates the eyeball;
receiving, by the controller, the receive optical power value sent by the photoelectric detector,
determining, based on the receive optical power value, an optical power reference value that satisfies a specified functional relationship with the receive optical power value; and
determining an eyeball line-of-sight direction that matches the optical power reference value as a current gaze direction of the eyeball based on a prestored one-to-one matching relationship between a plurality of eyeball gaze directions and a plurality of optical power reference values.

10. The eyeball tracking method according to claim 9, further comprising:
transmitting, by a display light source, a display light ray to the beam scanner;
projecting, by the beam scanner, the display light ray onto the entrance pupil optical apparatus; and
reflecting or reproducing, by the entrance pupil optical apparatus, the display light ray projected onto the entrance pupil optical apparatus, wherein the reflected or reproduced display light ray is imaged on a retina after passing through a pupil of the eyeball.

11. An eyeball tracking method, comprising:
transmitting, by an illumination light source, an illumination light ray to a beam scanner;
projecting, by the beam scanner, the illumination light ray illuminating an eyeball at a preset angle;

collecting, by a photoelectric detector, a receive optical power value of an eyeball reflection light ray; and sending the receive optical power value to a controller, wherein the eyeball reflection light ray is a light ray reflected by the eyeball when the projected illumination light ray illuminates the eyeball; and receiving, by the controller, the receive optical power value sent by the photoelectric detector, determining, based on the receive optical power value, an optical power reference value that satisfies a specified functional relationship with the receive optical power value, and determining an eyeball line-of-sight direction that matches the optical power reference value as a current gaze direction of the eyeball based on a prestored one-to-one matching relationship between a plurality of eyeball gaze directions and a plurality of optical power reference values.

12. The eyeball tracking method according to claim 11, wherein the illumination light ray is infrared or near-infrared light.

13. The eyeball tracking method according to claim 11, wherein the illumination light source is electrically connected to the controller to send an eighth instruction signal to the illumination light source, wherein the eighth instruction signal is used to instruct the illumination light source to transmit the illumination light ray; and wherein the illumination light source is configured to:
receive the eighth instruction signal, and
transmit the illumination light ray to the beam scanner according to the eighth instruction signal.

14. The eyeball tracking method according to claim 13, wherein the photoelectric detector is electrically connected to the controller; wherein the controller is further configured to send a ninth instruction signal to the photoelectric detector, wherein the ninth instruction signal is used to instruct the photoelectric detector to collect J receive optical power values within the $H'^{th}$ detection cycle, wherein H' is an integer greater than or equal to 1, and J is an integer greater than or equal to 1; and wherein the photoelectric detector is configured to receive the ninth instruction signal, and collect the J receive optical power values within the $H'^{th}$ detection cycle according to the ninth instruction signal, so that the controller determines the current gaze direction of the eyeball based on the J receive optical power values collected by the photoelectric detector within the $H'^{th}$ detection cycle, wherein for different values of H', a time interval between a collection time point of the $L^{th}$ receive optical power value in the J receive optical power values and a start collection time point of the $H'^{th}$ detection cycle is constant, wherein L is an integer greater than or equal to 1 and less than or equal to J.

15. The eyeball tracking method according to claim 14, wherein the beam scanner is electrically connected to the controller to send a tenth instruction signal to the beam scanner, wherein the tenth instruction signal is used to instruct the beam scanner to scan the illumination light ray within the $H'^{th}$ detection cycle; and wherein the beam scanner is configured to:
receive the tenth instruction signal, scan the illumination light ray within the $H'^{th}$ detection cycle according to the tenth instruction signal, and project the scanned illumination light ray which illuminates the eyeball at a preset angle.

16. The eyeball tracking method according to claim 15, wherein the illumination light ray transmitted by the illumination light source within each detection cycle comprises W illumination time points, wherein within any detection cycle, a time interval between the $F^{th}$ illumination time point in the W illumination time points and an earliest illumination time point in the W illumination time points is equal to a time interval between a collection time point of the $L^{th}$ receive optical power value collected by the photoelectric detector within the detection cycle and a start collection time point of the detection cycle.

17. The eyeball tracking method according to claim 14, wherein the controller is configured to:

receive the J receive optical power values collected by the photoelectric detector within the $H'^{th}$ detection cycle;

obtain a transmit optical power value corresponding to each of the J receive optical power values, wherein the transmit optical power value is an optical power value of an illumination light ray transmitted by the illumination light source at a collection time point of the receive optical power value;

determine an optical power reference value for the $H'^{th}$ detection cycle based on the transmit optical power value and the receive optical power value, wherein the optical power reference value is a ratio of each of the J receive optical power values to the corresponding transmit optical power value;

determine, in prestored optical power reference values for all of a plurality of detection cycles, an optical power reference value for a target detection cycle that has a highest similarity to the optical power reference value for the $H'^{th}$ detection cycle, wherein the plurality of detection cycles comprise the target detection cycle; and determine, as the current gaze direction of the eyeball, an eyeball gaze direction corresponding to the prestored optical power reference value for the target detection cycle.

18. The eyeball tracking method according to claim 14, wherein the controller is configured to:

obtain the J receive optical power values that are collected within the $H'^{th}$ detection cycle and that are sent by the photoelectric detector;

determine an optical power reference value for the $H'^{th}$ detection cycle based on the J receive optical power values, wherein the optical power reference value is a largest value in the J receive optical power values;

determine a first correspondence between the optical power reference value for the $H'^{th}$ detection cycle and a corresponding collection time point;

determine, in a plurality of prestored correspondences, a second correspondence with a highest similarity to the first correspondence, wherein the plurality of correspondences are correspondences between optical power reference values for all of a plurality of detection cycles and corresponding collection time points; and determine an eyeball gaze direction corresponding to the prestored second correspondence as the current gaze direction of the eyeball.

* * * * *